US012434354B2

(12) United States Patent
Grubb

(10) Patent No.: US 12,434,354 B2
(45) Date of Patent: Oct. 7, 2025

(54) MULTITOOL WITH LOCKING MULTIPURPOSE DRIVER

(71) Applicant: Joseph M. Grubb, Wytheville, VA (US)

(72) Inventor: Joseph M. Grubb, Wytheville, VA (US)

( * ) Notice: Subject to any disclaimer, the term of this patent is extended or adjusted under 35 U.S.C. 154(b) by 388 days.

(21) Appl. No.: 18/060,540

(22) Filed: Nov. 30, 2022

(65) Prior Publication Data

US 2023/0364746 A1 Nov. 16, 2023

Related U.S. Application Data

(60) Provisional application No. 63/364,695, filed on Nov. 30, 2021.

(51) Int. Cl.
*B25B 7/22* (2006.01)
*B25B 7/08* (2006.01)
*B25B 23/00* (2006.01)

(52) U.S. Cl.
CPC .................. *B25B 7/22* (2013.01); *B25B 7/08* (2013.01); *B25B 23/0035* (2013.01)

(58) Field of Classification Search
CPC ......... B25B 7/08; B25B 7/22; B25B 23/0035; B25F 1/003; B25F 1/04
See application file for complete search history.

(56) References Cited

U.S. PATENT DOCUMENTS

| | | | | |
|---|---|---|---|---|
| 5,142,721 | A * | 9/1992 | Sessions | B25F 1/003 30/162 |
| 5,212,844 | A * | 5/1993 | Sessions | B25F 1/003 30/162 |
| 6,119,561 | A | 9/2000 | Anderson et al. | |
| D497,791 | S | 11/2004 | Rivera et al. | |
| 6,983,506 | B1 | 1/2006 | Brown | |
| 7,185,569 | B2 | 3/2007 | Knight et al. | |
| 7,347,128 | B2 | 3/2008 | Rivera et al. | |
| 7,406,896 | B2 * | 8/2008 | Rivera | B25F 1/003 7/128 |
| 7,634,956 | B2 | 12/2009 | Rivera et al. | |
| 8,276,486 | B2 * | 10/2012 | Hsieh | B25B 23/0028 81/424 |
| 9,225,153 | B1 | 12/2015 | Anderson et al. | |
| 11,292,105 | B2 * | 4/2022 | Lazenby | B25B 7/22 |
| 11,794,313 | B2 * | 10/2023 | Bessac | B25B 7/10 |
| 2002/0178875 | A1 | 12/2002 | Lin | |
| 2003/0019045 | A1 * | 1/2003 | Ping | B25B 7/123 7/128 |
| 2007/0131069 | A1 | 6/2007 | Rivera et al. | |

FOREIGN PATENT DOCUMENTS

JP 2020124803 A 8/2020

* cited by examiner

*Primary Examiner* — David B. Thomas
(74) *Attorney, Agent, or Firm* — Johnston Holroyd; Mary-Jacq Holroyd

(57) ABSTRACT

First and second handles 18 and 20 extend from first and second plier parts 24 and 26 with a tool shaft 14 disposed on the handle 20 and extending outward of a pivot at 34 and stows into the outer side of the handle 20. The base 42 of the tool shaft 14 has a mating profile 80 which engages a complimentary mating profile 48 disposed on the pivot at 32 or at a complimentary mating profile 48 in an accessory tool 50. The tool shaft 14 is locked in place by closing the two handles 18 and 20 and engaging the handle locking mechanism 30, and extends from a center of the two handles 18 and 20 when closed.

19 Claims, 25 Drawing Sheets

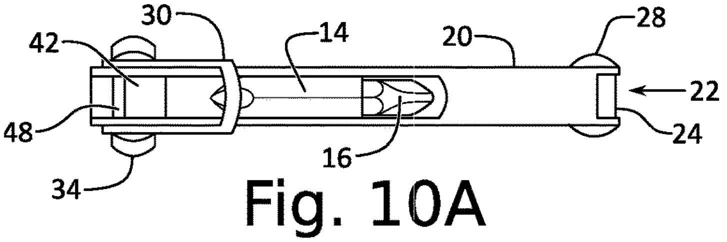
Fig. 10A
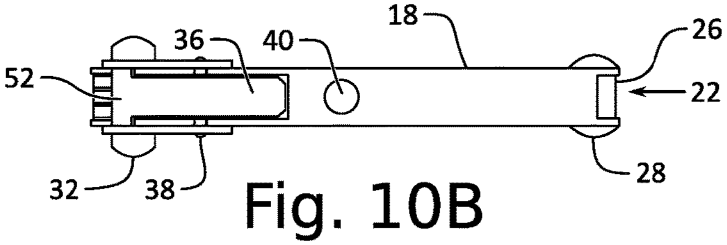
Fig. 10B
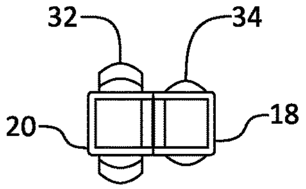
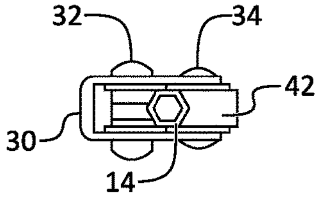
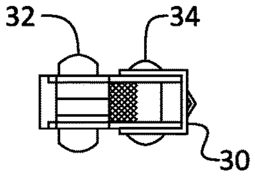
Fig. 10C
Fig. 10D
Fig. 10E
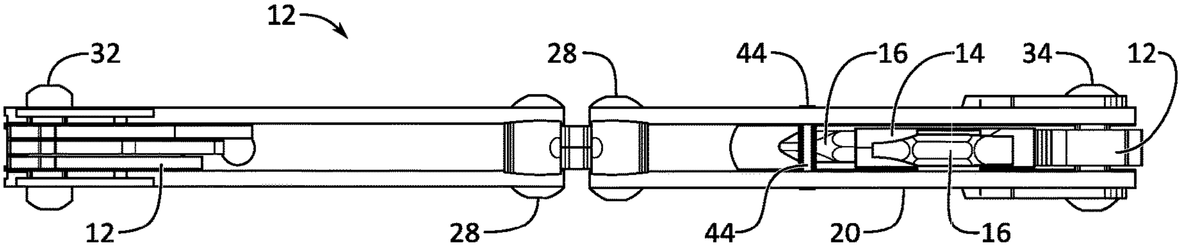
Fig. 11
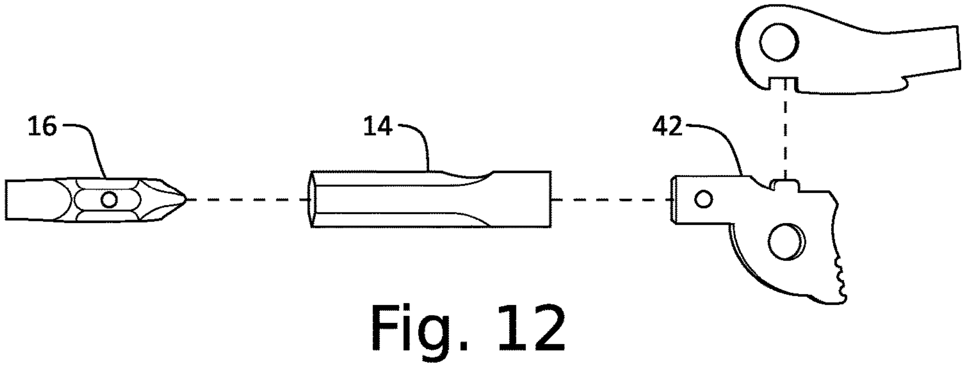
Fig. 12

MULTITOOL WITH LOCKING MULTIPURPOSE DRIVER

CROSS-REFERENCE TO RELATED APPLICATIONS

This application claims the benefit of U.S. Provisional Application Ser. No. 63/364,695 entitled "MULTITOOL WITH LOCKING MULTIPURPOSE DRIVER" filed on 30 Nov. 2021, the contents of which are incorporated herein by reference in its entirety.

COPYRIGHT NOTICE

A portion of the disclosure of this patent document may contain material which is subject to copyright protection. The copyright owner had no objection to the facsimile reproduction by anyone of the patent document or the patent disclosure as it appears in the Patent and Trademark Office patent files or records, but otherwise reserves all copyright rights whatsoever.

BACKGROUND OF THE INVENTION

Multitools are well known devices that have several tool functions included in a single device. Many multitools are designed to be folded up with pliers in the middle as one end of a pair handles, and additional tool functions disposed on features folded into the handles of the pliers. Several examples are shown in U.S. Pat. No. 9,225,153 to Anderson et al., which teaches a multi-function wire stripping hand tool, and includes descriptions of the prior art. U.S. Pat. No. 6,119,561 to Anderson et al. similarly shows multitools including an embodiment which has a shaft and bits, pliers and handles. These devices include screwdriver shafts and tool bits of various kinds and sizes. Unfortunately, the screwdriver shaft may move or even close unintentionally while in use. Additionally, the shaft and bits are not centered with respect to the intended axis of rotation, which makes using them awkward and inefficient.

Restraining the movement of the various tool features of a multitool to keep them in position are also known. US Patent Application No. 2007/0131069 to Rivera et al. and published on 14 Jun. 2007 teaches a folding multipurpose hand tool including a pivoted latch that engages side walls of a handle and a base of a folding tool member to hold the folding tool member in a selected position. A safety interlock latch is provided which keeps a folding blade stowed in a handle when another tool is moved from a first position with respect to the handle. This invention keeps the knife in place (closed) so that it does not open while another tool is being used.

Pins or cutouts have been used to help secure components of a multitool in place during use. U.S. Pat. No. 6,983,506 to Brown on 10 Jan. 2006 teaches a universal, interchangeable tool attachment system, including a snap clip which is used to connect system components by rotating into a pin and secured thereby. The Japanese Patent No. JP2020124803A teaches a tool locking mechanism on a similar multitool which has a tool locking position and tab/notch Tool bits and tool bit holders/blocks have been incorporated into multitools to hold tool bits. US Patent Application No. 2002/0178875 to Lin and published on 5 Dec. 2002 teaches a combination wrench hammer set which includes a tool bit block and may be part of a multitool.

A multipurpose tool with tool bit bolder and blade lock is described in U.S. Pat. No. 7,634,956 to Rivera et al. which teaches a tool bit holder to place multiple tools which fits into the tool. The blade lock incorporates a lever and bar which mates with a notch in the base of the tool accessory to hold the tool accessory when it is extended and to prevent other accessories from opening at the same time as a knife, for example. U.S. Pat. No. 7,347,128 also to Rivera et al. teaches a similar multipurpose tool with a tool bit holder and blade lock. The tool is designed to both lock the tool accessory in place when extended and to prevent an accessory from being extended when another accessory is extended. U.S. Pat. No. 7,185,569 to Knight et al. also teaches a multipurpose folding tool that has a tool bit holder and a similarly functioning blade lock.

Some multitools may close unintentionally or have the screwdriver tool pivot while in use. Additionally, the handle may become open during use exposing the user's hands to be pinched by the handles or jabbed by a dislodged feature of the multitool. Furthermore, many of the accessories on the multitool, such as a screwdriver, extend from one of the handles requiring uneven rotation of the tool to use the screwdriver or similar tool that uses rotation.

SUMMARY OF THE INVENTION

The present invention relates to a multitool 12 with pliers which has two handles 18 and 20 and a plier head 22, in which at least one handle 20 has a driver component bit 16 and tool shaft 14 pivotably attached to the end of the handle 20 at 34. The tool shaft 14 receives a tool bit 16 on one end and a driver component base 42 at the other end. The driver component base 42 has a protrusion (tooth/tab) 80 disposed at the end of the tool shaft which interlocks with a space formed by the second end 34 of the handle pivot and the first end of one of the plier head 22 halves 24 and 26 when the tool shaft 14 is in an open position with the handles 18 and 20 in a closed position, or with the indentation (notch/slot) 48 in the base of another accessory tool 50 pivotably attached at 32 to the opposing handle 18. The tool shaft 14, base 42, and driver component bit 16 may be one integral component or may be composed of two distinct components.

A least one handle 20 has a driver component, the tool shaft 14, attached to the pivot point 34 at the second end of the handle 20. The driver component 14 has a protrusion (tooth/tab) at its base 42, 80 which mates with an interlocking indentation (notch/slot) 48 in the opposing handle 18. The interlocking indentation (notch/slot) 48 may be provided in a complimentary profile base 48 of another tool 50 pivotable attached to the opposing handle 18.

In alternative embodiments of the present invention the driver component base 42 may be provided with a curved base or mating profile 42, 80 and 82, which closely matches the curve or complementary mating profile 48 of the base(s) of tool(s) 50 disposed in the opposing handle 18. By meshing these curves, a secondary position of engagement approximately 90 degrees from the primary position may be achieved.

In another embodiment, the driver component base 42 may be provided with two protrusions (teeth/tabs) 80 and 82, the first of which holds the driver component tip 16 and tool shaft 14 along the same plane line as the handle 18 and 20 along the intended axis of rotation, and the second of which holds the tool shaft 14 at an angle nearly perpendicular to the line of the hand for added torque or access. It should be understood that, as used herein, the different mating profiles including protrusion (tooth/tab) and indentation (notch/slot) may be reversed, or combinations thereof. More than two positions may be utilized.

A handle locking mechanism 30 may be provided to hold the two handles 18 and 20 together preventing the unintentional opening of the handles 18 and 20 from the closed position. A crossmember part or bar 52 of the handle locking mechanism 30 may interact with the tool shaft 14 during deployment, so that the locking mechanism 30 is carried 180 degrees or so for free as it were, requiring only 90 degrees more rotation to engage. The locking mechanism 30 captures the extended shoulders of the fastener at 32 on the opposing handle 18 and renders the entire multitool 12 locked in this configuration.

Yet another embodiment, A plier head 22 and two handles 18 and 20, one handle 20 has a pivotably attached driver component base 42 and shaft 14 with a protrusion 80 or shape which interlocks with a space adjacent to the plier head 48 at 32 or indentation 48 provided in the base of another tool 50 pivotably attached to the opposing handle 18, or with the locking mechanism thereof. A tool shaft 14 accepts the stub/notch of the driver component base 42 and a tool bit 16 at the opposite end. The base 42 of the driver component shaft 14 may closely match the tools 50 in the opposite handle 18, so that the driver component shaft 14 can be fixed at 180 or roughly 90 degrees from stowed position. A pivotably attached locking mechanism 30 holds the two handles 18 and 20 together. A bit storage holder 54 accepts and captures the ball detent 58 of an industry standard ¼" double sided hex insert bit 16. The plier head 22 is stored chiefly within the recess of one handle 18 when closed. The mating part of a ball detent 58 and the ball detent 58 have the same number designation.

Additional advantages of the present invention include that it is a small hand multitool 12 with multiple functions conveniently disposed upon one tool 12. The multitool 12 contains a driver component base 42 and tool shaft 14 that accepts industry standard double sided tool bits 16 with ball detents 58 so that they may be easily interchanged. The driver component and tool shaft 14 is stowable (closed position), such that in the closed position, does not pose an injury risk as more traditional screw drivers and the like might when not in use. Stated advantages may be disposed on multitools 12 with various handle 18 and 20 configurations, wherein the minor tools 50 in the opposing handle 18 may be accessed by pivoting them toward the centerline of the closed tool 12, or accessed by pivoting them away from the centerline of the closed tool 12.

The driver component base 42 and tool shaft 14 may be separable into two distinct components. A driver component base 42 with a square male stub and a tool shaft 14 which accepts the male stub at one end and an industry standard tool bit 16 at the opposite end. Separable driver component base 42 may accept and turn/drive industry standard square drive sockets. Alternative embodiments of the multitool 12 may also be equipped to provide storage of a secondary double sided tool bit within the tool handle 20 or 18. The bit storage mechanism 54 may accept a tool bit 16 and capture the ball detent of the bit 16 within a depression or hole 58. The method of capture may allow the stored bit 16 to pivot about the ball detent at 58, providing secure storage as well as ease of access and removal.

An advantage of the present invention is that the movement of the shaft 14 is restrained by a locking mechanism(s) 80, 82 to 48 restriction once in position. The base 42 of the driver component shaft 14 may be configured in such a way as to interact with the features disposed in the opposing handle 18. The driver component base 42 may interact with features disposed in the opposing handle 18 to limit its motion when in an operable position. The multitool may contain a locking mechanism 80, 82, 48 which secures the two handles 18 and 20 together when the driver component base 42 and tool shaft 14 is engaged, rendering the multitool 12 fixed in this position and limiting the ability of the tool 12 to close or collapse accidentally during use. A secondary operable position approximately 80-90 degrees from the primary operable position may be provided. Such a position would provide additional torque and/or allow better access to driven fasteners during use. A blade lock incorporates a lever 36 and bar 52 which mates with a notch 48 in the base of the tool accessory 50 to hold the tool accessory 50 when the handles 18 and 20 are closed in the plier stow position.

The locking mechanism 30 secures the two handles 18 and 20 together when the driver component and tool shaft 14 is engaged, rendering the tool 12 fixed in this position and limiting the ability of the tool 12 to close or collapse accidentally during use. This locking mechanism 30 may be partially deployed when rotating a tool accessory, such as a tool shaft 14 or screwdriver 14. It is an advantage of the present invention that movement of the tool shaft 14 is restricted so accidental closing cannot occur. Another advantage of the present invention is that the entire tool 12 can be rendered fixed/rigid.

An advantage of the present invention is that the shaft 14 is centered with respect to the intended axis of rotation. The driver component base 42 and tool shaft 14 may be deployed/engaged so that the installed tool bit 16 is centered with respect to the intended axis of rotation, making it more efficient to use the tool 12 and rendering the tool 12 more like a traditional turning/driving tool (screwdriver) than has been possible previously with tools 12 of this type. An added advantage of the present invention is that the tool bit 16 is rendered centered with respect of the intended axis of rotation without having to remove and replace components.

In another alternative embodiment, two protrusions 80, 82 may be disposed on the driver component base 42, the first of which holds the driver component base 42 and tool shaft 14 along the same plane/line as the handle 18 and 20 and intended axis of rotation, and the second of which holds the tool shaft at an angle nearly perpendicular to the line of the handle 18 and 20 for added torque or access, providing two positions in which the tool shaft 14 may be angled.

Yet another advantage of the present invention is that the driver component base 42, tool shaft 14, tool bit 16 and associated locking mechanism 80, 82 may all be deployed and engaged using only one hand since the locking mechanism 42 also has a ridged portion 84 that can be deployed using a thumb or fingernail.

Other aspects of the present invention includes that the handles 18 and 20 are locked into a closed position, the tool can be used to drive various bits and sockets, and the tool 12 provides for securing an additional bit 16 within the handle 18 and 20.

These and other aspects of the present invention will become readily apparent upon further review of the following drawings and specifications.

BRIEF DESCRIPTION OF DRAWINGS

The novel features of the described embodiments are specifically set forth in the appended claims; however, embodiments relating to the structure and process of making the present invention may best be understood with reference to the following description and accompanying drawings.

FIGS. 2A-2C show side views of an alternative embodiment of a multitool 12 that can be reduced in size to form a miniature multitool 12, with FIGS. 2A and 2B showing the internal components outlined in dashed lines, while FIG. 2C shows a side view without the internal dashed lines.

FIGS. 10A-10E depict various views of the handles 18 and 20 from the edges and the top with FIG. 10A showing the handle 20 with the tool shaft 14 and bit 16 stowed with the handle lock 30 fully open in the stowed position, FIG. B shows the accessory tool 50 lock 36 and rivet 40 with the bar 52 that engages the complimentary matting profile 48 when a tool 50 is extended, FIG. 10C shows an end without handle lock 30, FIG. 10D shows the end with the tool shaft 14 deployed, and FIG. 10 E shows the end with the tool shaft 14 stowed and the handle lock 30 in the open position.

FIG. 11 shows an edge view of an embodiment of a multitool 12 according to the present invention in which more than one tool 50 is stowed in the handle 18 and showing the tool shaft 14 stowed.

FIG. 12 is an exploded view showing the tool shaft 14 with the base 42 and bit 16 with the complimentary mating 48 of a tool accessory 50.

DETAILED DESCRIPTION OF THE INVENTION

Figure 1:
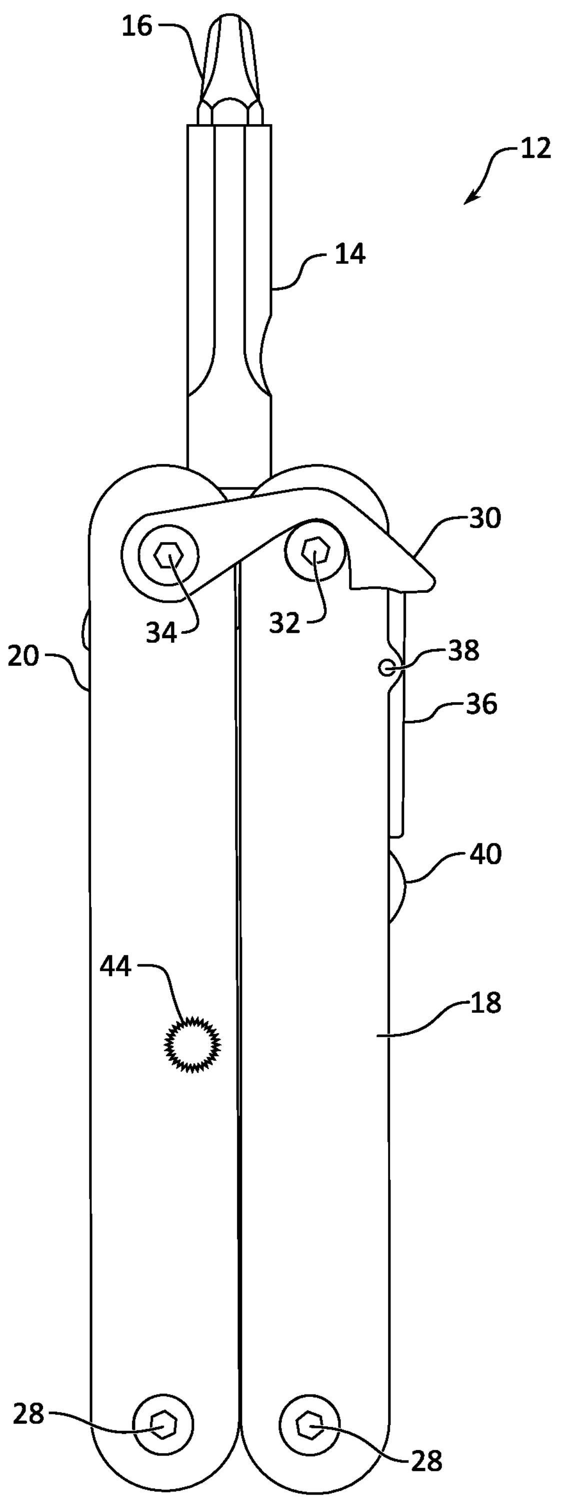
FIG. 1 shows a side view of a multitool 12 with locking multipurpose driver shaft 14, with a driver bit 16 engaged in the driver shaft 14, in which the driver shaft 14 extends from closed and locked handles 18 and 20.

A side view of an embodiment of a multitool 12 with locking multipurpose driver shaft 14 is shown in FIG. 1. The driver shaft 14 extends from the center of the multitool 12 when the handles 18 and 20 are in a locked closed position with the driver shaft extended. The plier head 22 is not visible in FIG. 1, because it is stowed within the handles in the closed position regardless of whether the driver shaft 14 or other tool 50 is extended from the handle 18 or 20. A latch 30 can be seen in FIG. 1 and is used to lock the handles 18 and 20 together.

At least one tool bit 16 is provided which fits within the tool shaft 14. The tool bit 16 may be two sided. For example, the tool bit 16 may have a Philips head and a flat head disposed on opposing ends of the tool bit 16. A bit storage component holder 54 to retain tool bits 16 therein may be provided for embodiments of the present invention that have more than one tool bit 16. A driver bit 16 is engaged in the driver shaft 14. A tool latch 36 is also shown which pivots at 38 and is released by pushing lever 36. The spring 56 is held in place by the rivet 40. Additional pivots at 28, 32, and 34 provide attachments of tools 50 at 32 and 34, and the driver shaft 14 at 34, to the handles 18 and 20. The plier head 22 plier parts 24 and 26 pivotably attach to the handles 18 and 20 at 28. Additional tool accessories 74 may be attached at 28, as discussed later herein. The driver component 14 with a protrusion (tooth/tab) 80 which interlocks with the space 48 formed by the second end of the handle pivot at 32 and the first end of one of the plier head halves 22 when the tool shaft 14 is in an open position and the handles 18 and 20 are in a closed position.

The tool driver shaft 14 has first and second ends. The tool shaft 14 may have a hexagonal opening at the first end to accept tool bits and a square opening at the second end to accept the male stubs of the driver component. By removing the tool shaft 14 from the driver component base 42, standard ¼" drive sockets could be fitted to and driving by the driver component base 42.

Another embodiment of the present invention provides for a curved base 42 to the driver component shaft 14. The curve of this base 42 may closely match the curve 48 of the minor tools 50 disposed in the second end 32 of the opposing handle 18. By rotating the driver component base 42 approximately 90 degrees and engaging the locking mechanism 80, 82, 48, the curved base 42 would mesh with the interior implements, and thus be fixed in a position nearly perpendicular to the handles 18 and 20.

In the alternative, each handle 18 and 20 may be comprised of opposing handle parts creating an opening therebetween to permit the plier halves 24 and 26 to be encased therein when the handles 18 and 20 are in a closed position. Alternatively, the handles 18 and 20 may simply have an alcove sufficient to accommodate the plier halves 24 and 26. The simplest embodiments depicted in FIGS. 2A-2C could easily use a handle 20 with an alcove to accommodate the tool shaft 14.

Figure 2A:
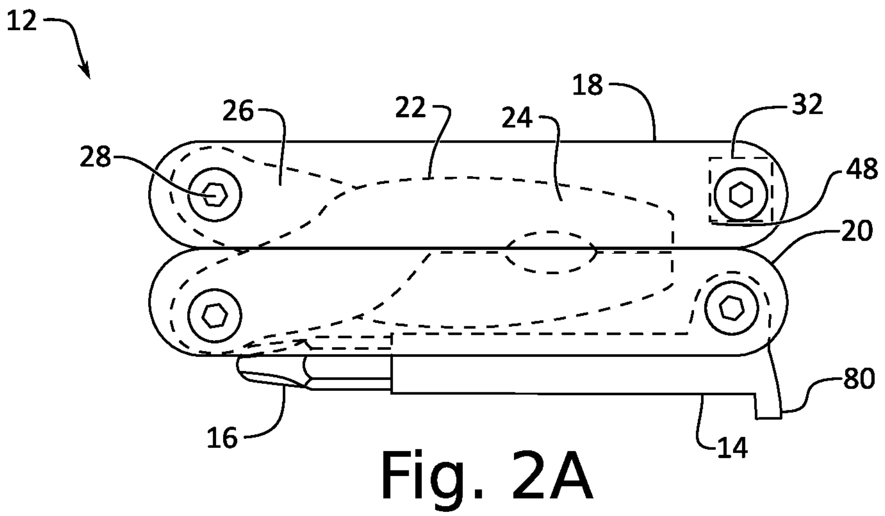
Figure 2B:
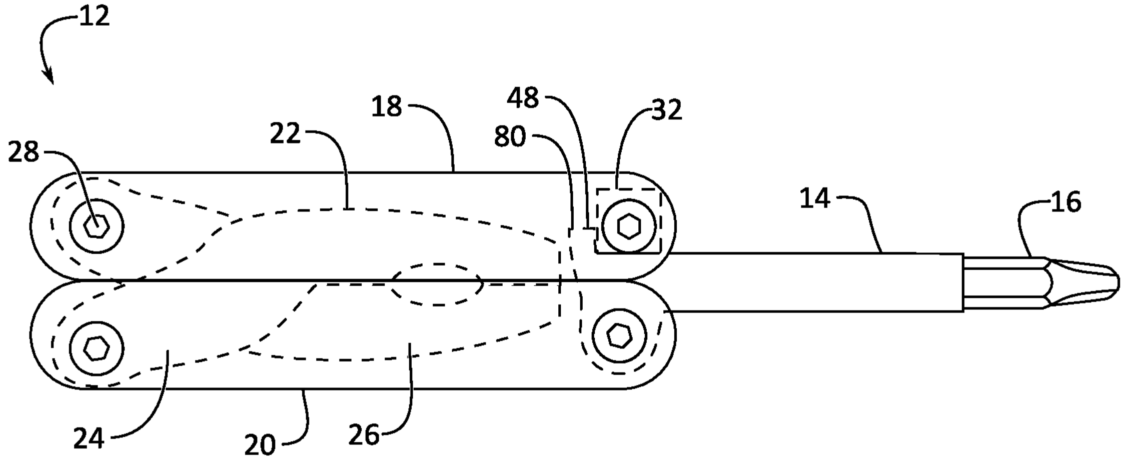
Figure 2C:
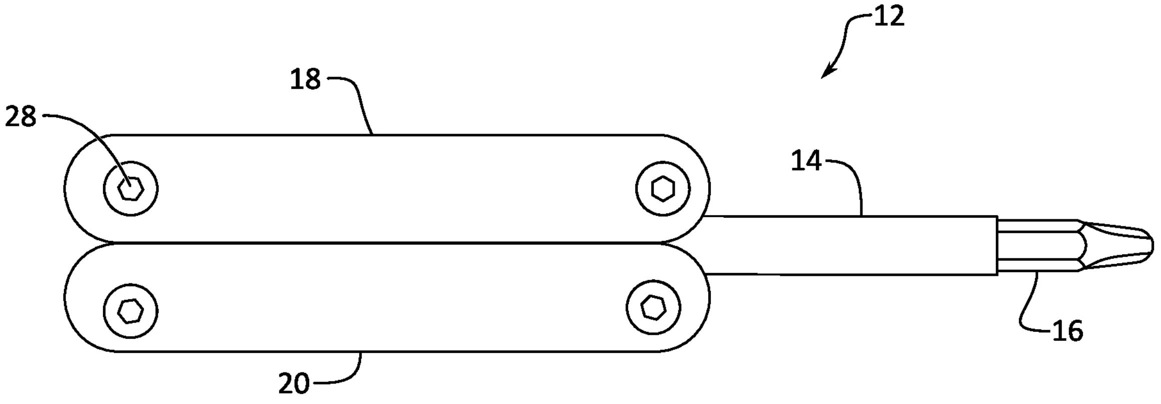

FIGS. 2A-2C show side views of an alternative embodiment of a multitool 12 that can be reduced in size to form a miniature multitool 12. FIGS. 2A and 2B shows the internal components outlined in dashed lines. FIG. 2C shows a side view of FIG. 2B without the internal dashed lines demonstrating the central location of the driver shaft 14 when extended from the handles 18 and 20. This is a simplest and potentially smallest embodiment of the present invention. The multitool 12 has a plier head 22 and first and second handles 18 and 20. The plier head 22 has opposing first and second plier parts 24 and 26 which pivot at 46 to open and close when the multitool 12 is in an open position. Each of the first and second handles 18 and 20 extend from the first and second plier halves 24 and 26 at 28. A tool shaft 14 is disposed on the handle 20 opposite the pivot at 28 at a pivot at 34. The tool shaft 14 extends outward of the pivot at 34 and stows into the outer side of the handle 20. The tool shaft 14 has a mating profile 80 which engages a complimentary mating profile 48 disposed on the pivot at 32 and locks the tool shaft 14 by closing the two handles 18 and 20 with the tool shaft 14. The tool shaft 14 is positioned and extends from a center of the two handles 18 and 20 when closed.

Figure 3:
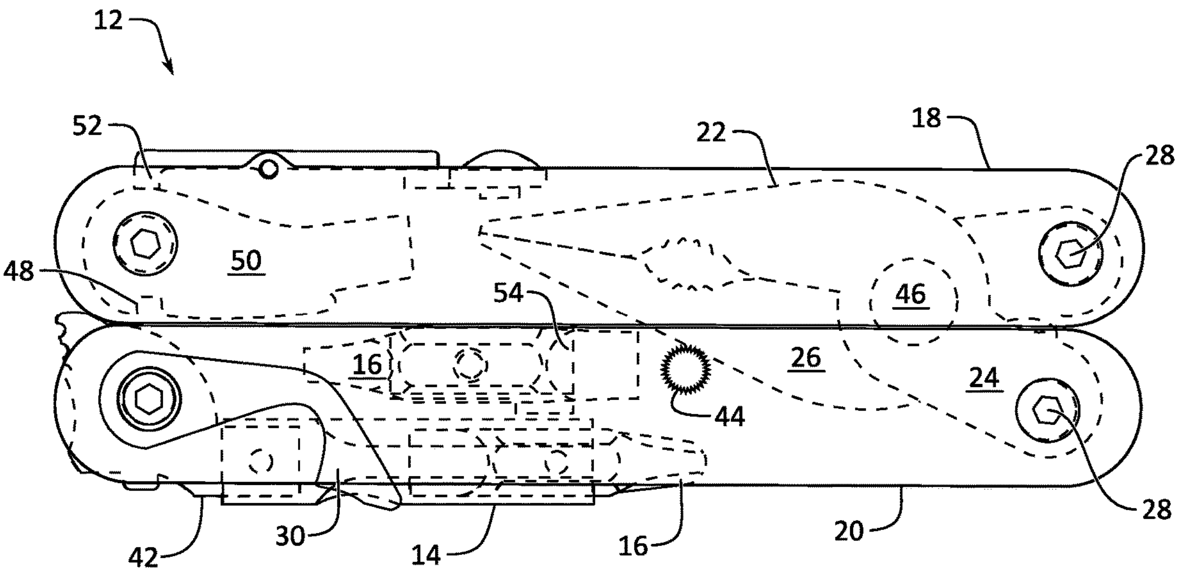
FIG. 3 shows a side view of a multitool 12 with locking multipurpose driver 14 according to an embodiment of the present invention with the internal components outlined.
Figure 4:
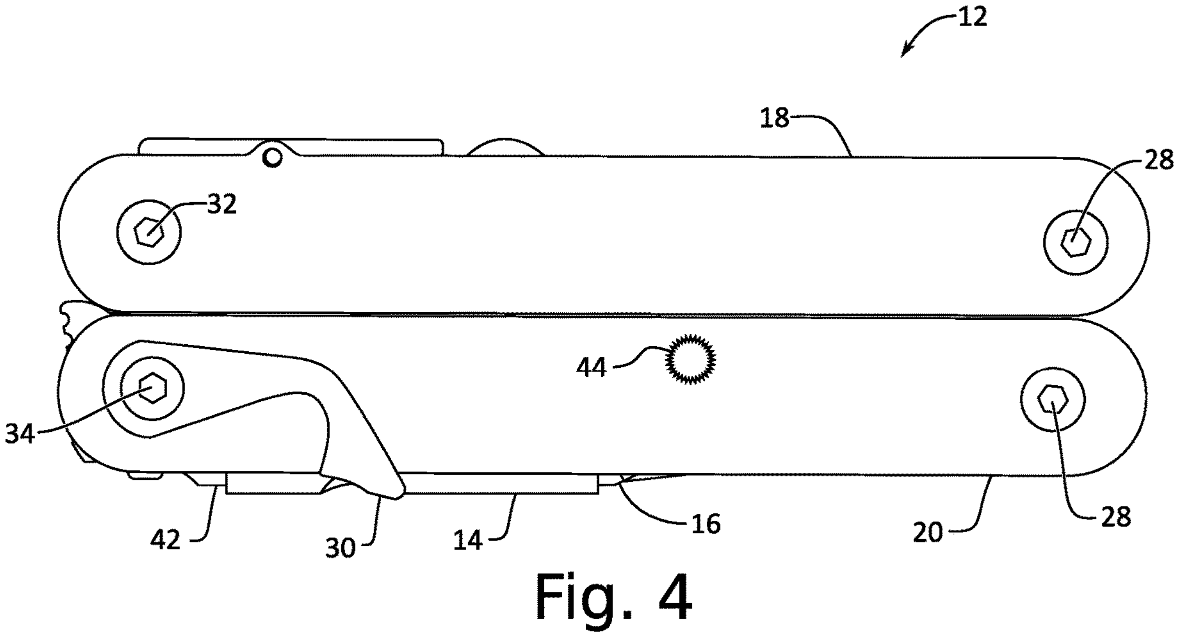
FIG. 4 shows an outer side view of the embodiment depicted in FIG. 3.
Figure 5:
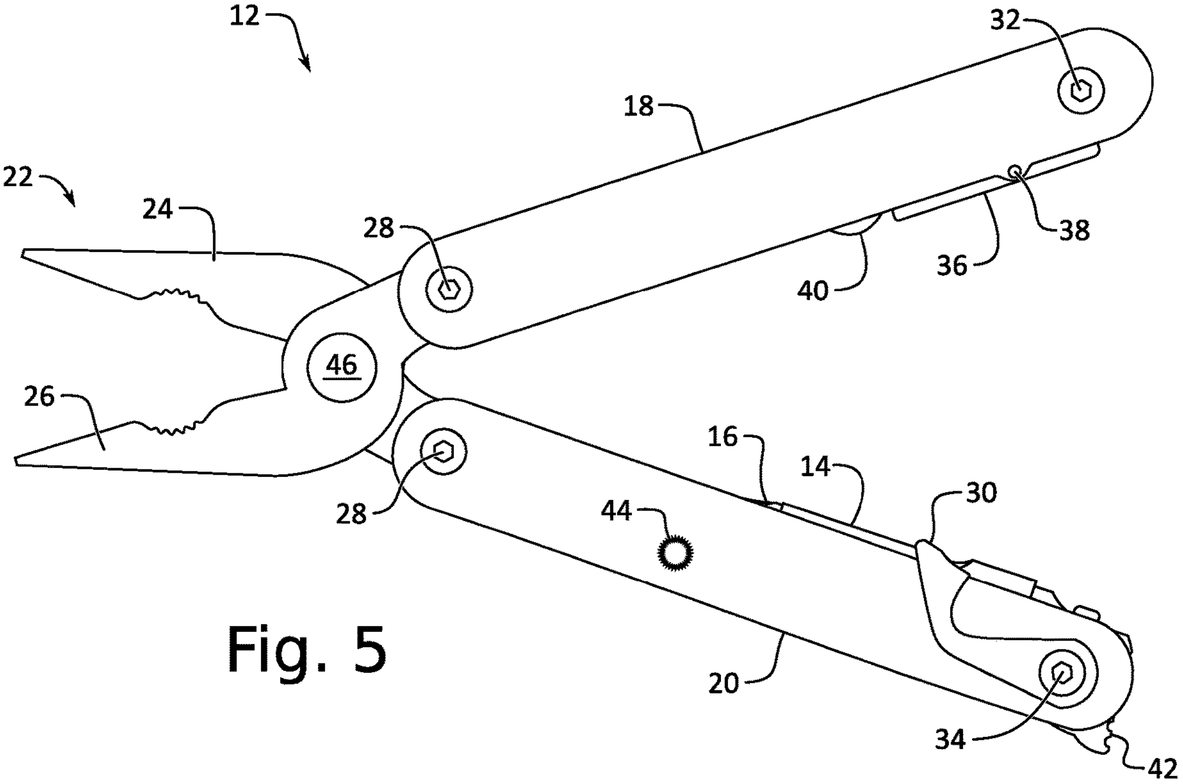
FIG. 5 shows a side view of the embodiment depicted in FIG. 3 with the pliers 22 in the open position.
Figure 6:
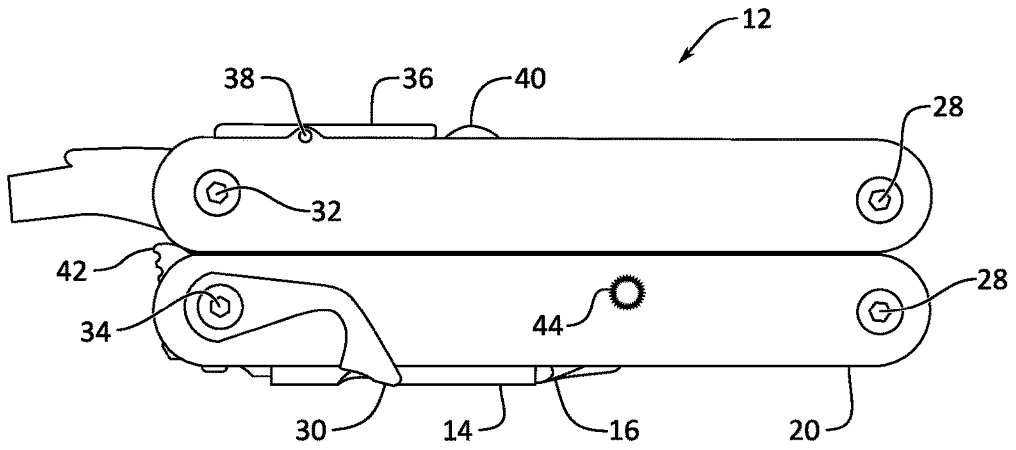
FIG. 6 is a side view of the embodiment depicted in FIG. 3 in which the accessory tool 50 is extended and the handles 18 and 20 are in the closed position.

FIG. 3 shows a side view of a multitool 12 with locking multipurpose driver 14 in a closed position with all internal components from the closed position outlined. FIG. 4 shows an outer side view of the embodiment depicted in FIG. 3. The multitool 12 with locking multipurpose driver shaft 14 has a plier head 22. The plier head 22 has opposing plier halves 24 and 26. Each plier half 24 or 26 has a central pivot at 46 and with each handle at 28 as shown. The opposing plier halves are pivotable at 46 attached by a fastener (such as shown in FIGS. 24A, 24B, 34A and 34B) between the first and second ends at 28 of each half 24 or 26 of the plier head 22. FIG. 5 shows a side view of the embodiment depicted in FIG. 3 with the pliers 22 in the open position. FIG. 6 is a side view of the embodiment depicted in FIG. 3 in which the tool 50 is extended and the handles 18 and 20 are in the closed position. First and second handles 18 and 20 are attached to the pliers halves 24 and 26. Each of the handles 18 and 20 has a first end at pivot 28 and a second end at pivots 32 and 34. The first end pivots at 28 of each handle 18 and 20 is pivotably attached at the second ends at 28 of each plier half 24 and 26. FIG. 4 shows a side view with driver engaged and locked.

Figure 7A:
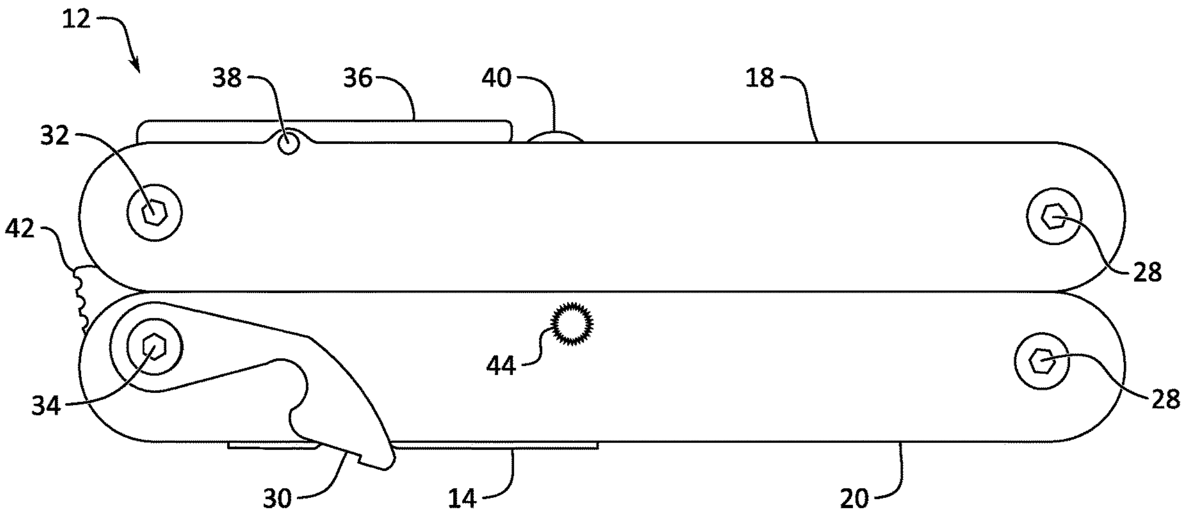
FIGS. 7A and 7B show side views of a multitool 12 depicting an alternative embodiment of the present invention which has more than one accessory tool 50 each of which has the same complimentary mating profiles 48 with FIG. 7B shows the internal position of the tool parts when stowed.
Figure 7B:
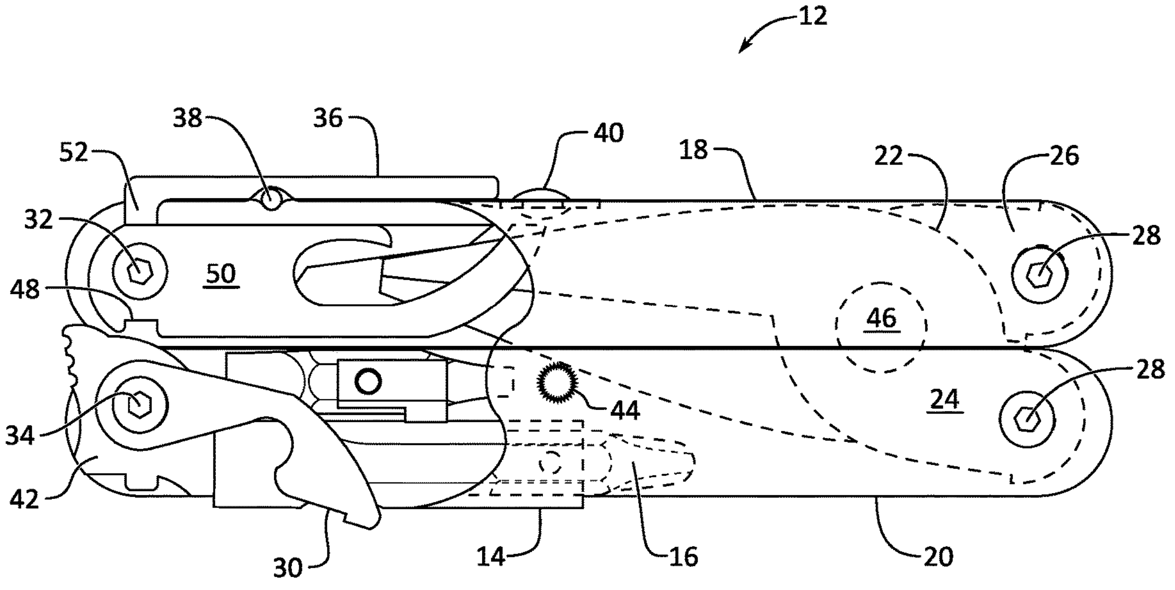
Figure 8:
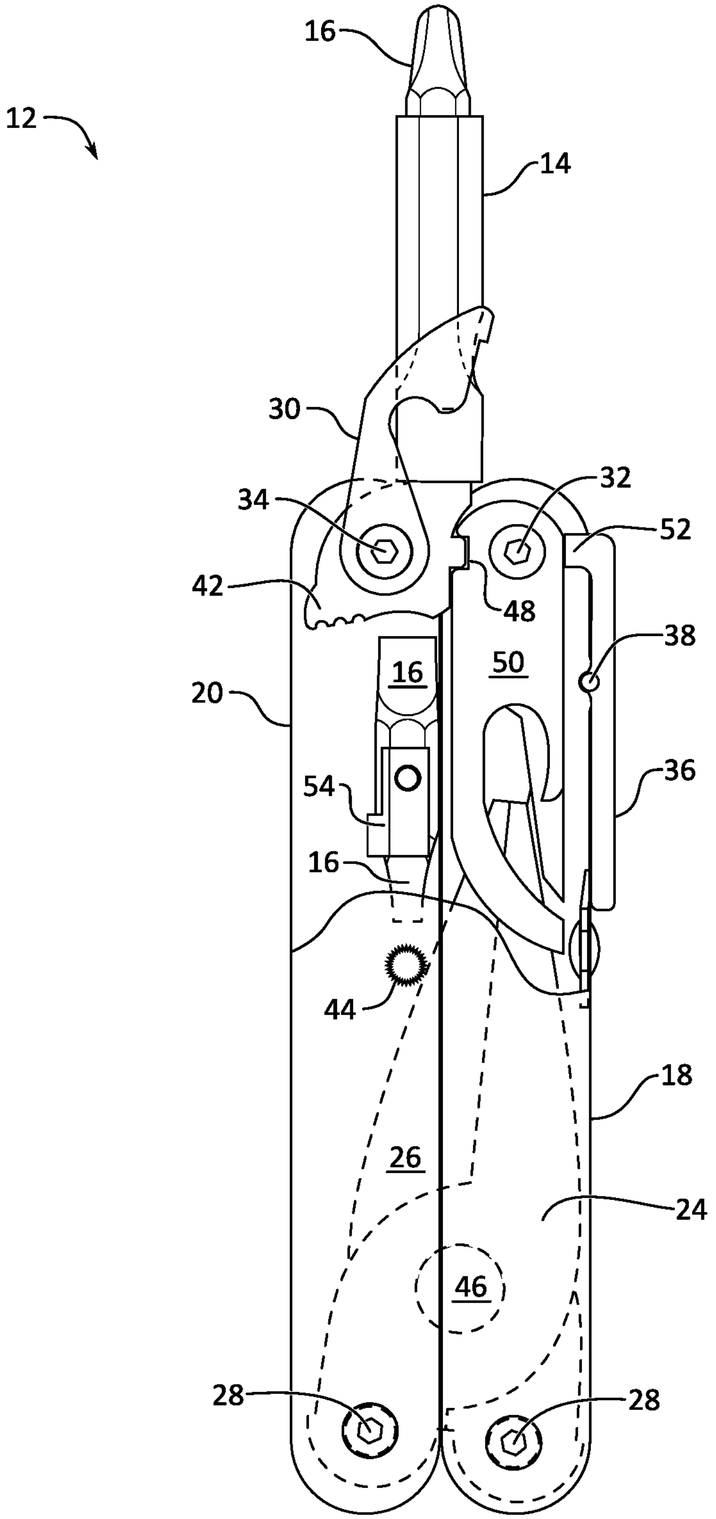
FIG. 8 shows the multitool 12 of FIGS. 7A and 7B with the tool shaft 14 fully extended and profile 48 mated with the complimentary profile 48 of a tool accessory 50 with the handle lock mechanism 30 partially deployed.

FIGS. 7A and 7B show side views of a multitool 12 depicting an alternative embodiment of the present invention which has more than one accessory tool 50 each of which has the same complimentary mating profiles 48 with FIG. 7B shows the internal position of the tool parts when stowed. FIG. 8 shows the multitool 12 of FIGS. 7A and 7B with the tool shaft 14 fully extended and profile 48 mated with the complimentary profile 48 of a tool accessory 50 with the handle lock mechanism 30 partially deployed.

Figure 9A:
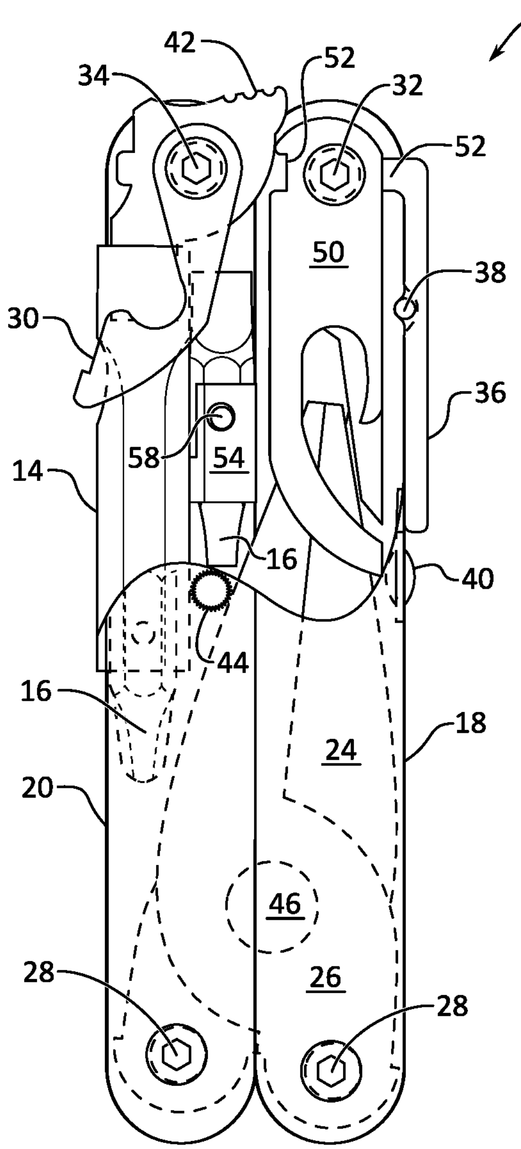
FIGS. 9A-9C show another alternative embodiment of a multitool 12 showing an alternative mating profile 80 (fully extended position) and 82 (angle position) on the base 42 with FIG. 9B depicting the tool shaft at an angle so the handle can be used for added torque and FIG. 9C depicting to tool shaft in the fully extended position.
Figure 9B:
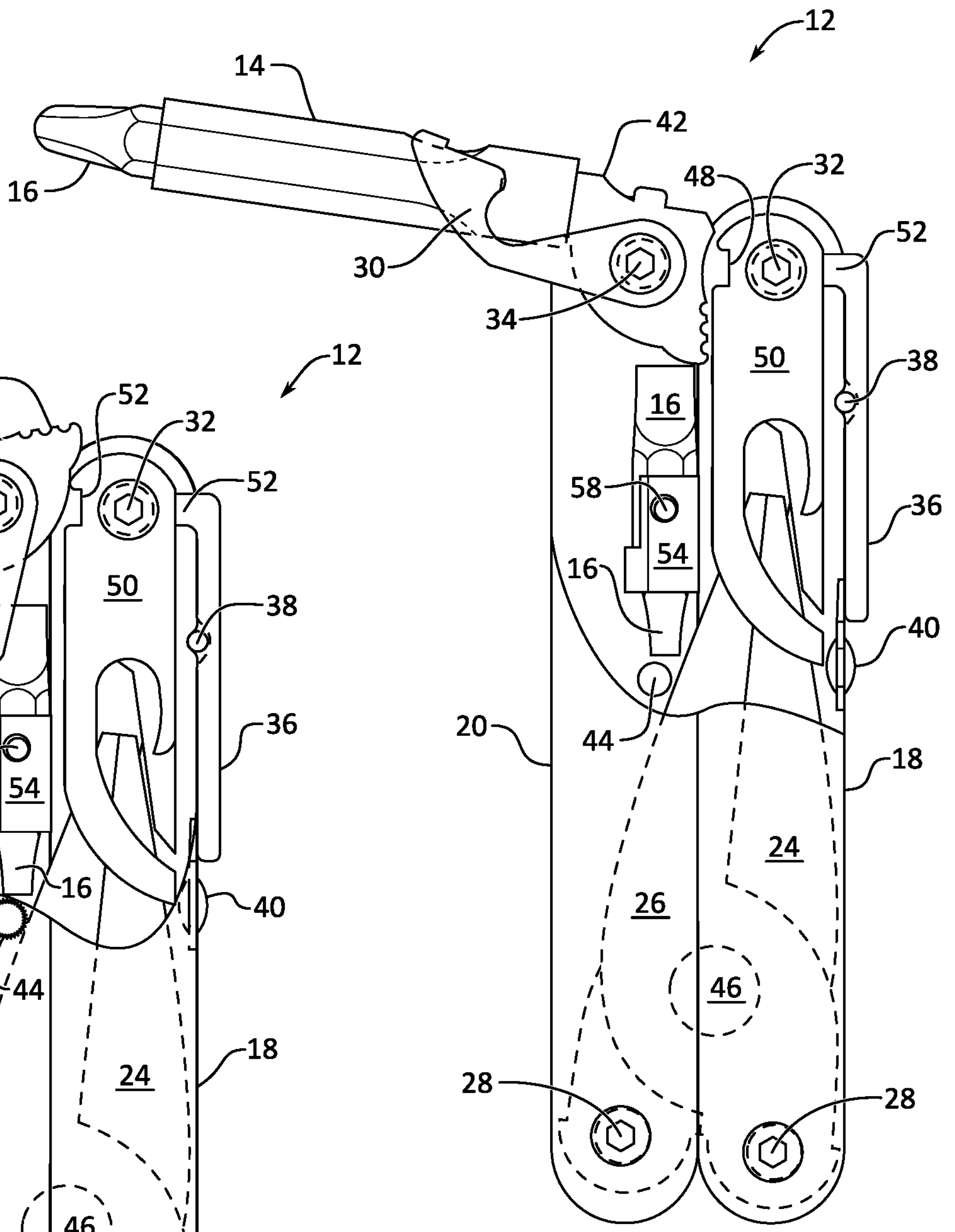
Figure 9C:
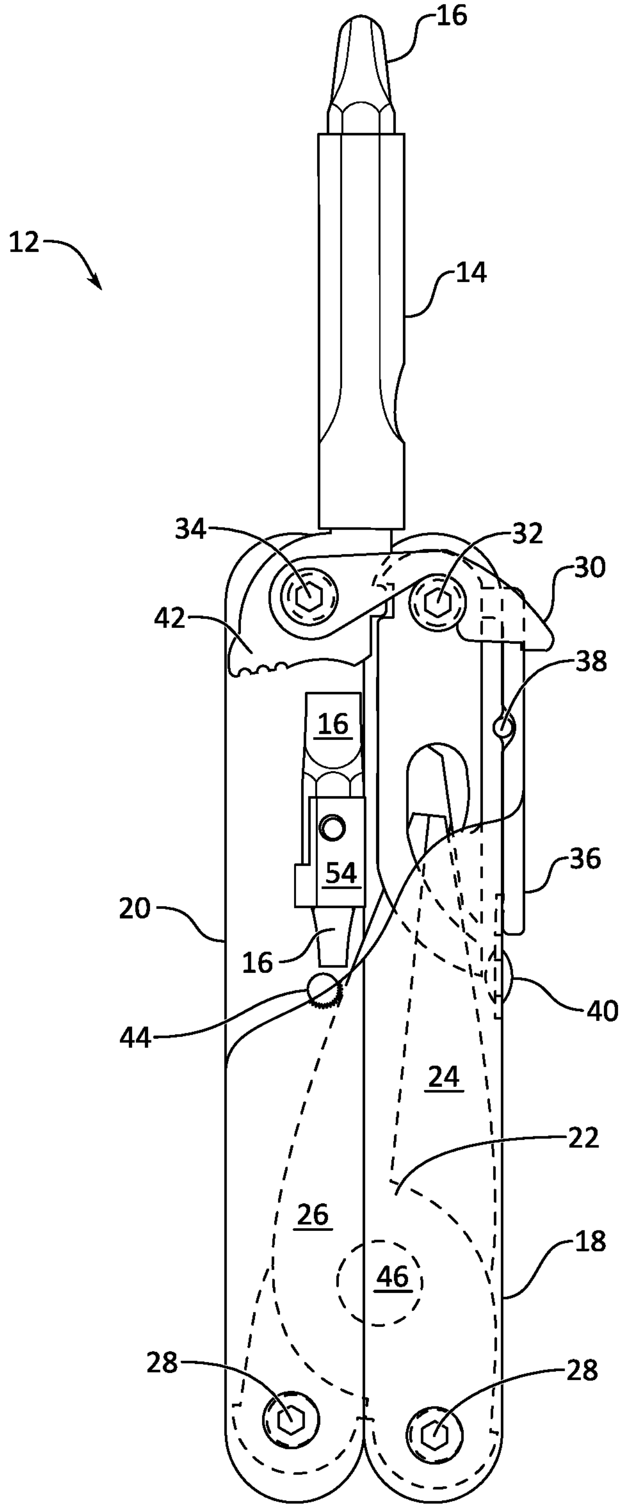

FIGS. 9A-9C show another alternative embodiment of a multitool 12 showing an alternative mating profile 80 (fully extended position) and 82 (angle position) on the base 42. FIG. 9B depicts the tool shaft at an angle so the handle can be used for added torque, and FIG. 9C depicts to tool shaft in the fully extended position. In the stowed position, the plier head 22 can be seen off centered by the pin shaft 44 that holds the plier head 22 in position allowing the extra bit holder 54 be used.

FIGS. 10A-10E depict various views of the handles 18 and 20 from the edges and the top. FIG. 10A showing the handle 20 with the tool shaft 14 and bit 16 stowed with the handle lock 30 fully open in the stowed position. FIG. B shows the accessory tool 50 lock 36 and rivet 40 with the bar 52 that engages the complimentary matting profile 48 when a tool 50 is extended. FIG. 10C shows an end without handle lock 30, FIG. 10D shows the end with the tool shaft 14 deployed. FIG. 10 E shows the end with the tool shaft 14 stowed and the handle lock 30 in the open position. FIG. 11 shows the other side of the handles to those depicted in FIGS. 10A-10E, in which more than one tool 50 is stowed in the handle 18 and showing the tool shaft 14 stowed. FIG. 12 is an exploded view showing the tool shaft 14 with the base 42 and bit 16 with the complimentary mating 48 of a tool accessory 50.

A locking mechanism 30 may be provided to hold the two handles 18 and 20 together, preventing the unintentional opening of the handles 18 and 20 from the closed position. The locking mechanism 30 is pivotably attached to the second end at 34 of the handle 20, and rotates to capture the extended shoulders of the fastener at 32 in the second of the opposing handle 18.

Figure 13A:
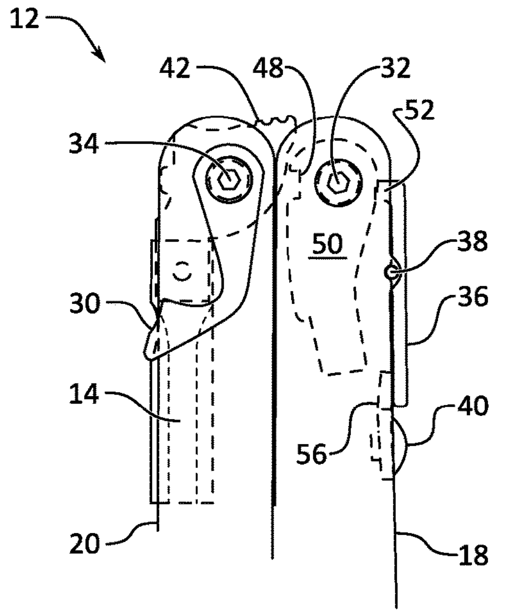
FIG. 13A-13D show side views of an alternative embodiment of a multitool 12 of the present invention showing differing position of the handle locking mechanism 30 going from the stowed position in FIG. 13A, to partially deployed positions in FIGS. 13 B and 13C, to all the way deployed and locked at pivot 32.
Figure 13B:
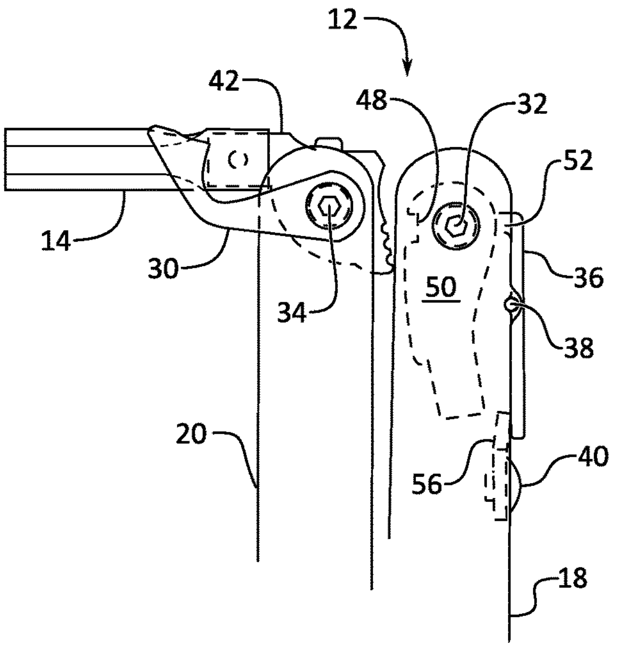
Figure 13C:
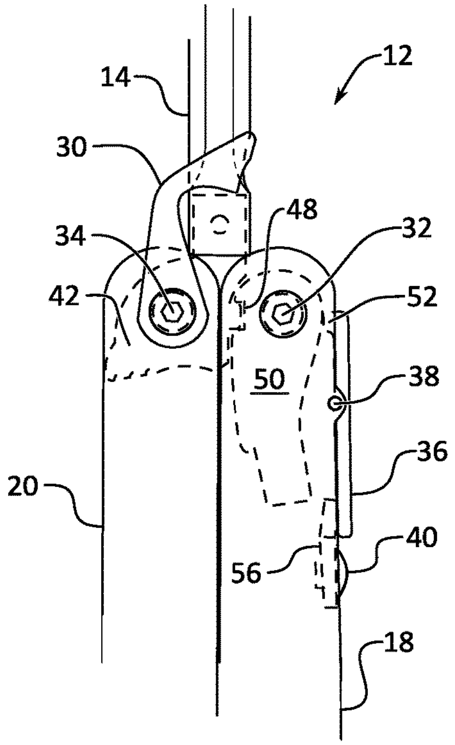
Figure 13D:
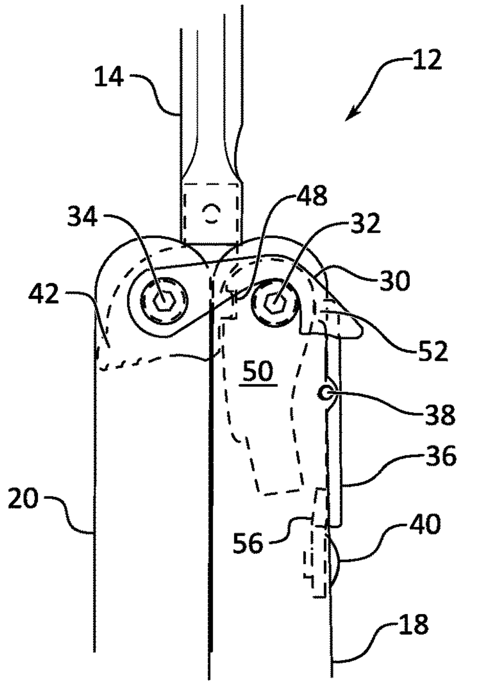

FIG. 13A-13D show side views of an alternative embodiment of a multitool 12 of the present invention showing differing position of the handle locking mechanism 30 going from the stowed position in FIG. 13A, to partially deployed positions in FIGS. 13 B and 13C, to all the way deployed and locked at pivot 32. Once the handle locking mechanism 30 is in place and the tool shaft 14 fulling extended, the multitool 12 becomes rigid and the tool shaft 14 cannot be moved. This is a safety feature as well as convenient. It can also be seen that the tool shaft 14 extends from the middle of the handles 18 and 20.

The locking mechanism 30 may possess a crossmember that spans the tool shaft 14, such that the tool shaft 14 carries the locking mechanism 30 via the interference of the tool shaft 14 and the crossmember of the locking mechanism 30 when the driver component base 42 and tool shaft 14 are rotated. Thus, the locking mechanism 30 may be rotated 180 degrees by deploying the driver component 42 and tool shaft 14, requiring only approximately 90 degrees further rotation in order to engage the extended shoulders of the fastener at 32 in the opposite handle 18.

Figure 14:
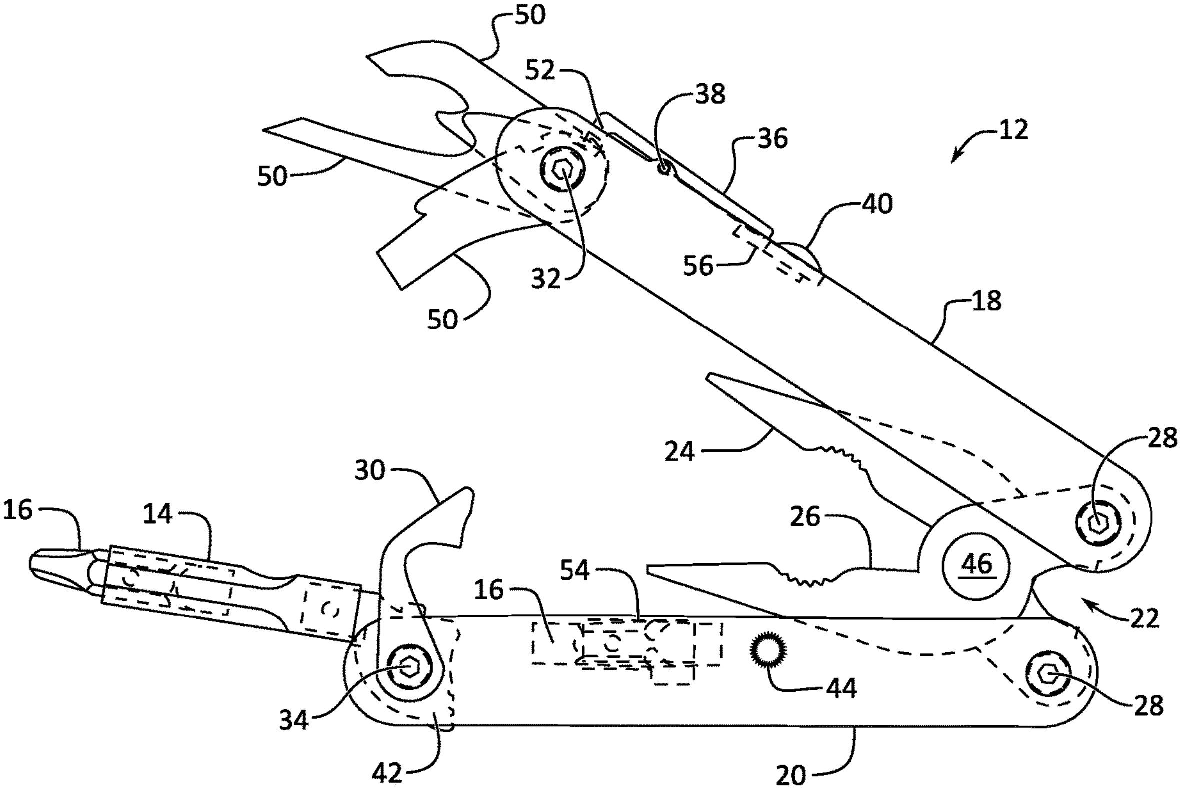
FIG. 14 shows a side view of a multitool 12 according to alternative embodiments of the present design depicting the parts in open display.
Figures 15A, 15B, 15C:
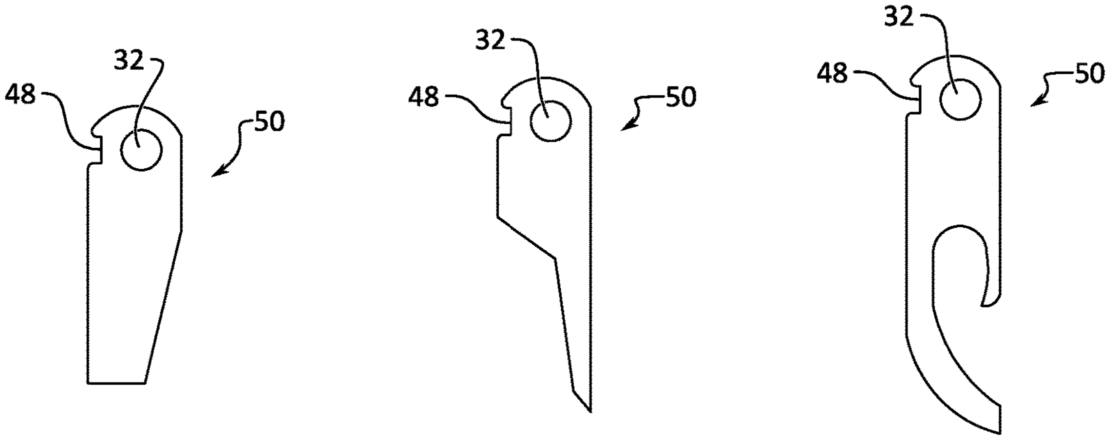
FIGS. 15A-15C show alternative accessory tools 50 with complimentary mating profiles
48.
Figure 16A:
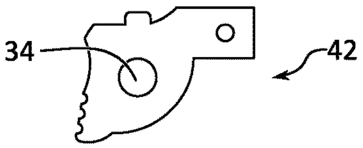
FIG. 16A-16F show an alternative view of a tool shaft base 42 which an alternative profile from different angles and demonstrating the interaction with the complimentary mating profile 48 of tool accessory 50.
Figure 16B:
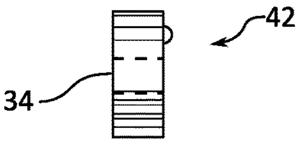
Figure 16C:
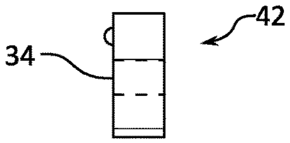
Figure 16D:
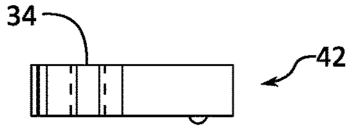
Figure 16E:
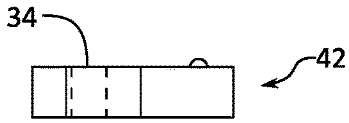
Figure 16F:
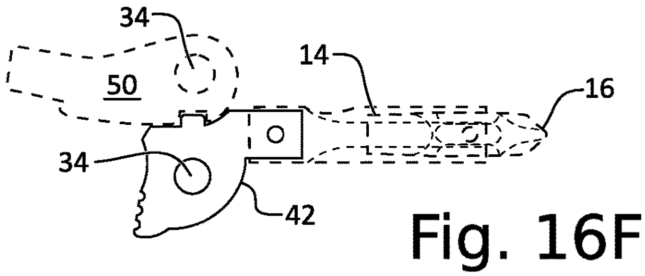
Figure 17A:
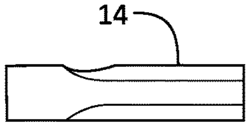
FIGS. 17A-17E show alternative profiles of a tool shaft 14 used, with square (FIGS. 17B and 17C) and hexagonal (FIGS. 17A and 17D) features as shown.
Figure 17B:
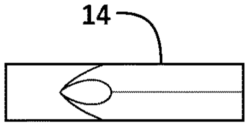
Figure 17C:
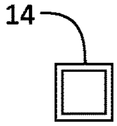
Figure 17D:
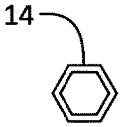
Figure 17E:
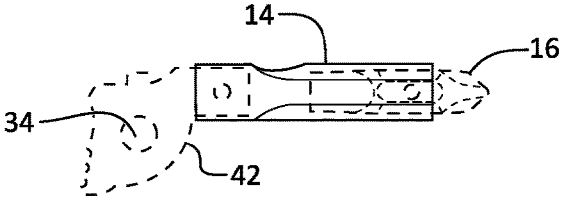
Figure 18A:
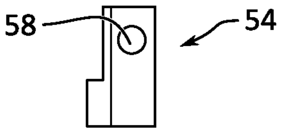
FIGS. 18A-18E depict different perspectives of a bit holder 54 that may be incorporated into a handle (18 or 20) to store additional bits 16 for the tool shaft 14.
Figure 18B:
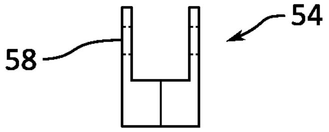
Figure 18C:
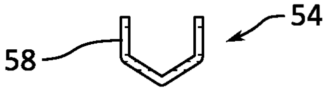
Figure 18D:
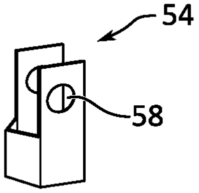
Figure 18E:
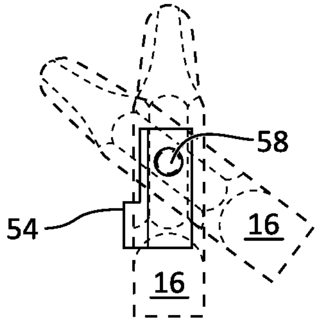
Figure 19A:
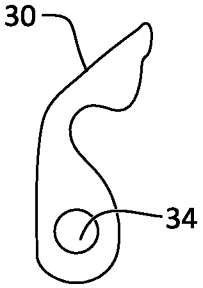
FIGS. 19A-19D show the handle locking mechanism 30 from various angles.
Figure 19B:
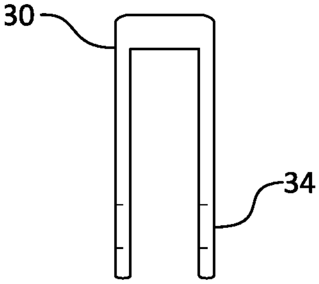
Figure 19C:
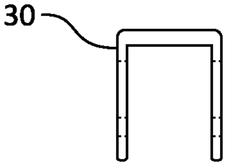
Figure 19D:
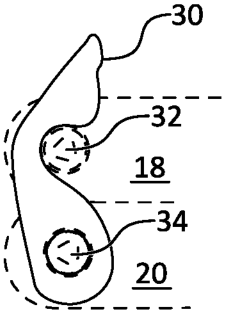

FIG. 14 shows a side view of a multitool 12 according to alternative embodiments of the present design depicting the parts in open display. FIGS. 15A-15C show alternative accessory tools 50 with complimentary mating profiles 48. FIG. 15A shows a large flat screwdriver accessory tool 50. FIG. 15B shows an awl accessory tool 50. FIG. 15B shows a bottle opener accessory tool 50.

FIG. 16A-16F show an alternative view of a tool shaft base 42. The base 42 has an alternative profile and is shown from different angles demonstrating the interaction with the complimentary mating profile 48 of tool accessory 50. The tool shaft base 42 fits the tool shaft 14. FIGS. 17A-17E show alternative profiles of a tool shaft 14 used, with square (FIGS. 17B and 17C) and hexagonal (FIGS. 17A and 17D) alternative options depicted. The tool shaft 14 for example may mate with a hexagonal tool bit 16 and with a square profile of a driver component base 42, and vice versa. Conventional tool bits 16 may be used, and include tool bits 16 with two flat screwdrivers and with one flat and one Phillips screwdrivers. The screwdriver bits 16 shown have ball detent for use with detents 58 on the tool shaft 14 and tool bit holder 54.

FIGS. 18A-18E depict different perspectives of a bit holder 54 that may be incorporated into a handle (18 or 20) to store additional bits 16 for the tool shaft 14. The bit storage component holder 54 has a shape which closely accepts the tool bit 16, while a hole or indentation 58 accepts the ball detente of the bit 16. This interaction secures the bit 16, while also allowing the bit 16 to pivot about its ball detente for ease of access and removal.

Figure 20A:
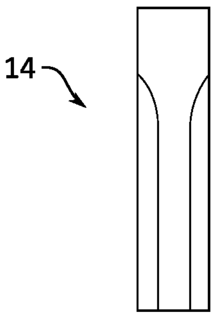
FIGS. 20A-20I shows various parts of the multitool 12 of the present invention including the tool shaft 14 (FIG. 20A), tool bit 16 (FIG. 20B), spare tool bit 16 (FIG. 20C), handle lock 30 (FIG. 20D), plier head 22 (FIG. 20E), handles 18 and 20 (FIG. 20F), tool lock lever 36 (FIG. 20G), rivet 40 (FIG. 20H), and tool lock lever spring 56 (FIG. 20I).
Figure 20B:
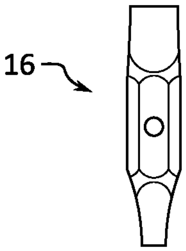
Figure 20C:
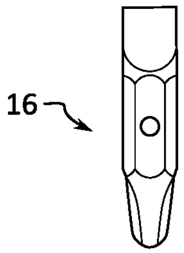
Figure 20D:
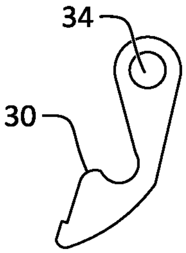
Figure 20F:
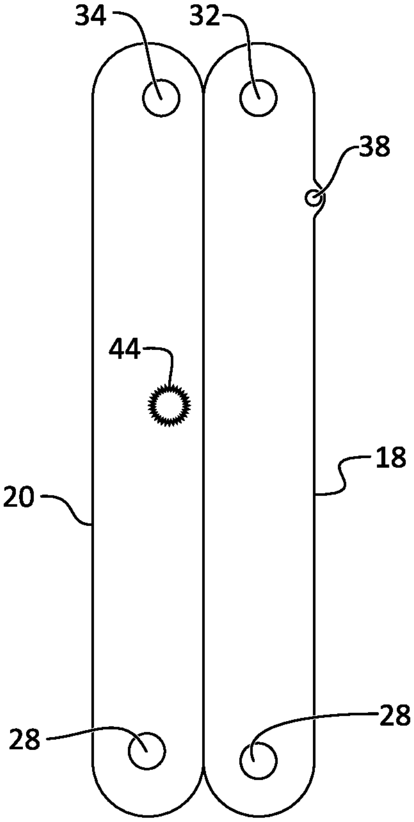
Figure 20G:
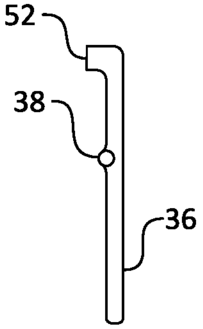
Figure 20E:
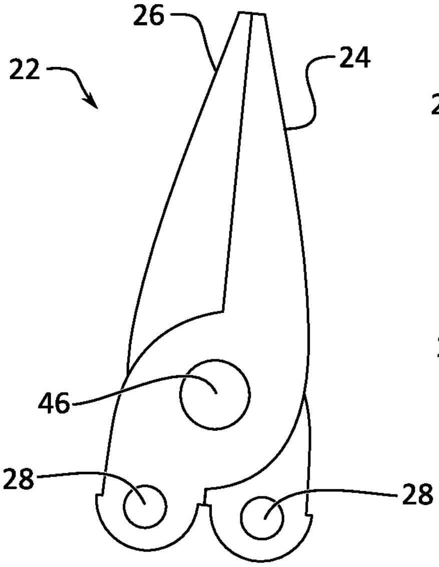
Figure 20H:
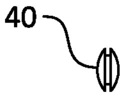
Figure 20I:
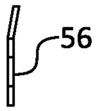
Figure 21A:
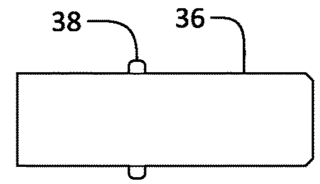
FIGS. 21A-21C shows front side and back views of a tool lock lever 36 with a mating bar 52 and a pivot 38.
Figure 21B:
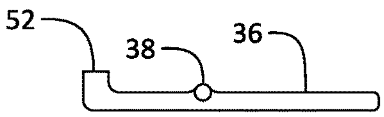
Figure 21C:
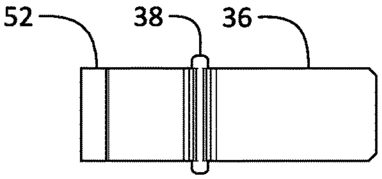
Figure 22A:
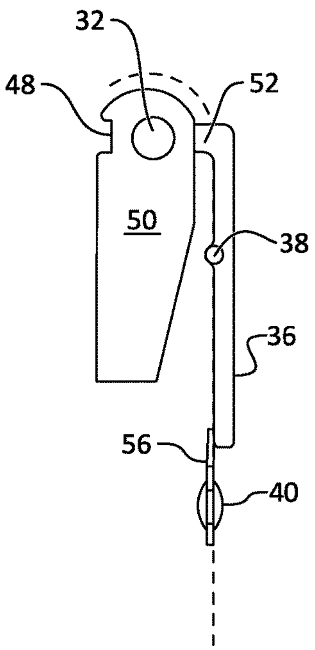
FIGS. 22A-22C show the operation of the tool lock lever 36 as it operates with a tool 50 that has a complimentary mating profile 48 that can be used to mate with the mating bar 52 of the tool lock lever 36 with the spring 56 and rivet 40 operating to release the tool lock lever 36 and free the tool accessory 50 to be stowed.
Figure 22B:
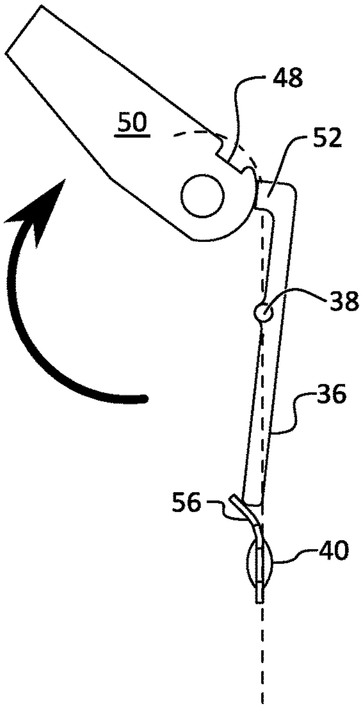
Figure 22C:
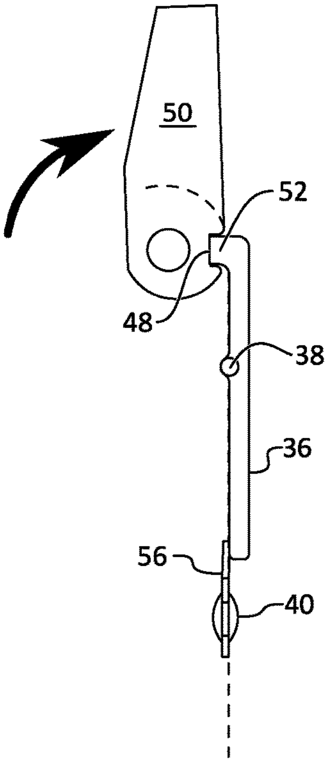
Figure 23A:
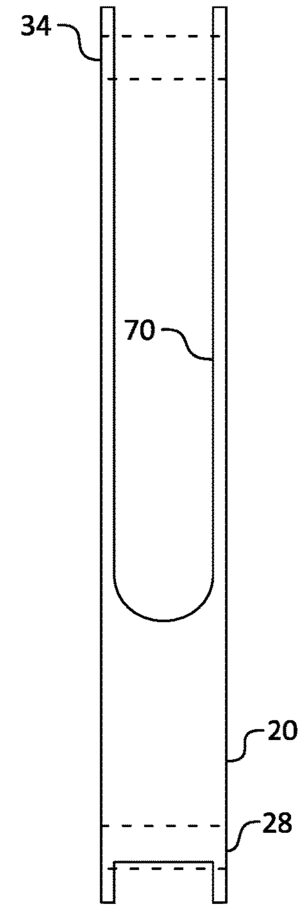
FIGS. 23A-23D show details of the handles 18 and 20 of an alternative embodiment of the multitool 12 according to the present invention.
Figure 23B:
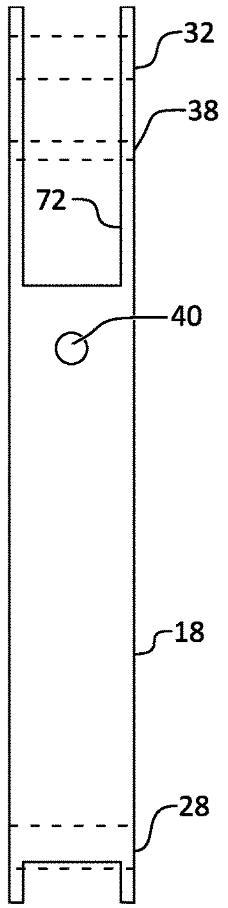
Figure 23C:
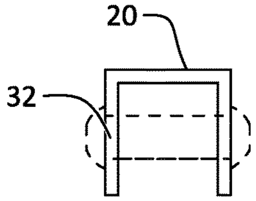
Figure 23D:
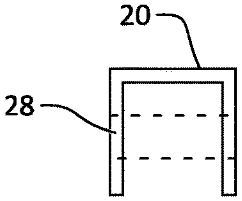

FIGS. 19A-19D show the handle locking mechanism 30 from various angles. FIGS. 20A-20I shows various parts of the multitool 12 of the present invention including the tool shaft 14 (FIG. 20A), tool bit (FIG. 20B), spare tool bit (FIG. 20C), handle lock 30 (FIG. 20D), plier head 22 (FIG. 20E), handles 18 and 20 (FIG. 20F), tool lock lever 36 (FIG. 20G), rivet 40 (FIG. 20H), and tool lock lever spring 56 (FIG. 20I). FIGS. 21A-21C shows front side and back views of a tool lock lever 36 with a mating bar 52 and a pivot 38. FIGS. 22A-22C show the operation of the tool lock lever 36 as it operates with a tool 50 that has a complimentary mating profile 48 that can be used to mate with the mating bar 52 of the tool lock lever 36 with the spring 56 and rivet 40 operating to release the tool lock lever 36 and free the tool accessory 50 to be stowed.

Figure 24A:
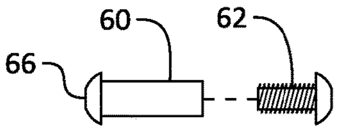
FIG. 24A-24C show an alternative embodiment for the pivots 28, 32, and 34 of the present invention including threaded pin 62, pin shaft 60, threaded pin 62 and pin shaft 60 heads 66 and 68, and spacer sleeve 64 which may be used as a plier stop 44.
Figure 24B:
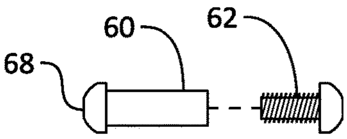
Figure 24C:
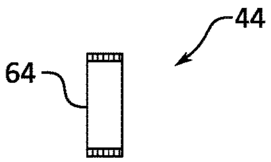

FIGS. 23A-23D show details of the handles 18 and 20 of an alternative embodiment of the multitool 12 according to the present invention. FIG. 24A-24C show an alternative embodiment for the pivots 28, 32, and 34 of the present invention including threaded pin 62, pin shaft 60, threaded pin 62 and pin shaft 60 heads 66 and 68, and spacer sleeve 64.

Figure 25:
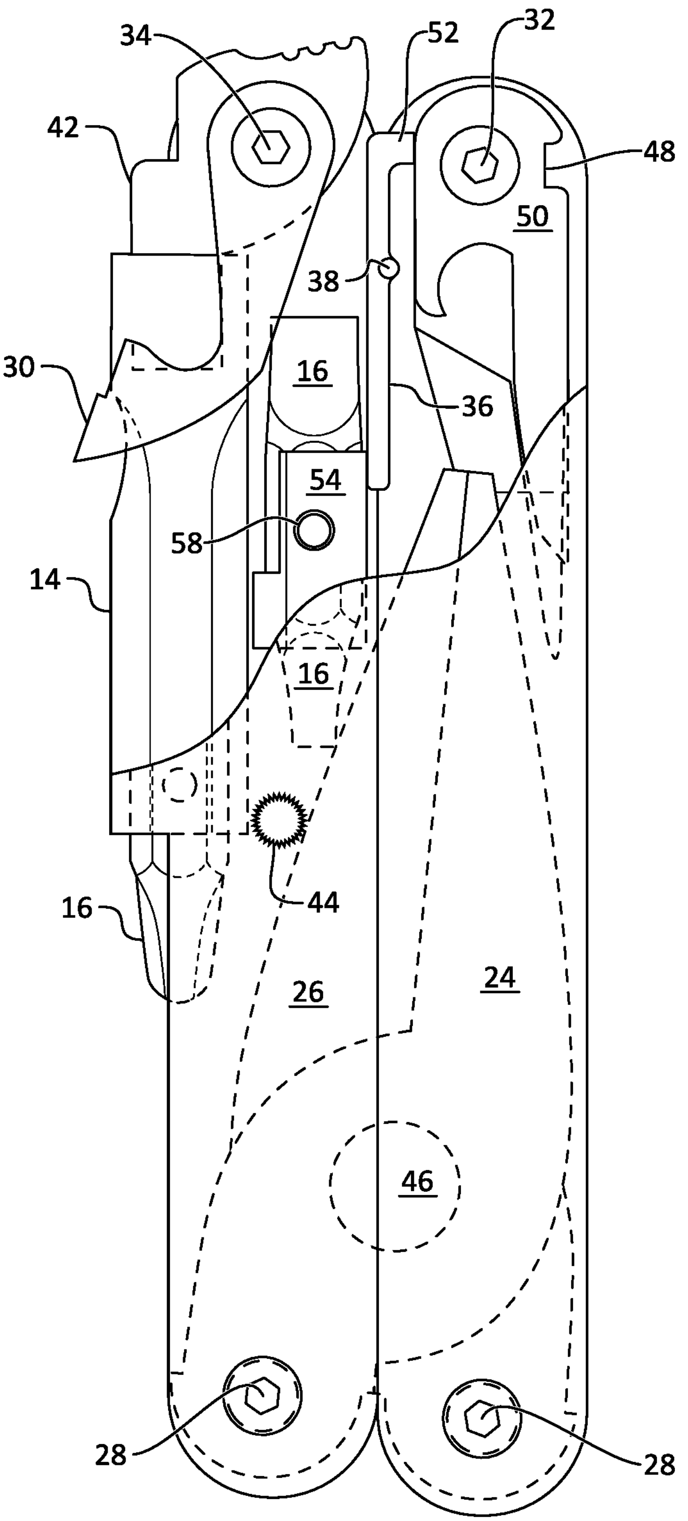
FIG. 25 shows another embodiment of the present design with the tool accessory locking mechanism 36 being disposed on the inside of the handle 18 in which the back profile of the bar 52 mates with the tool shaft 14 base 42.
Figure 26A:
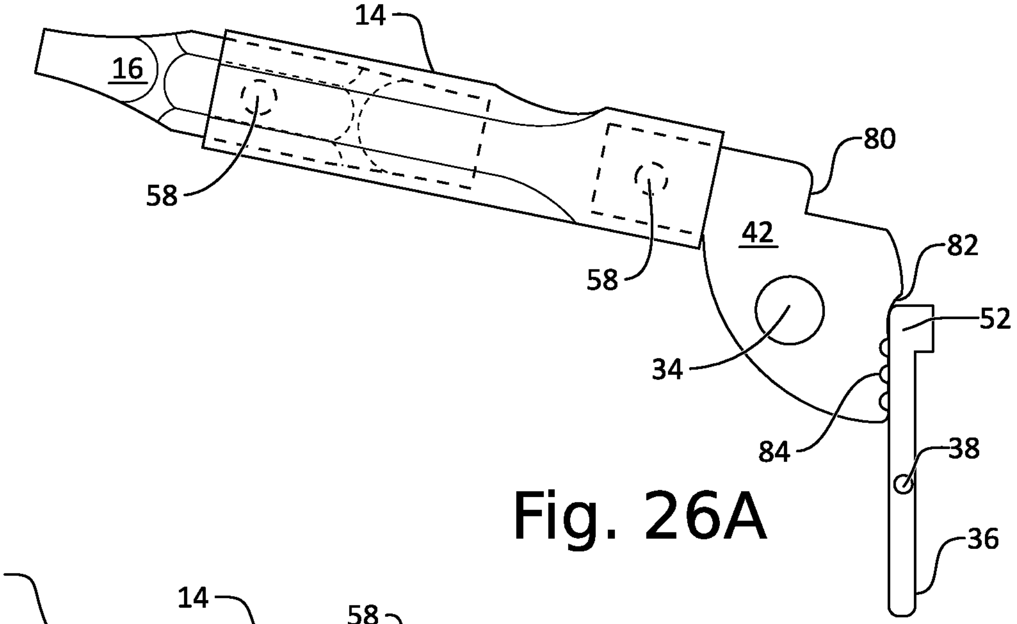
FIGS. 26A and 26B show an alternative configuration of the tool shaft base 42 and angle deployment mating profile 82 which permits the use of the drive shaft 12 fixed at an angle to the handles 18 and 20 and the handle locking mechanism 30 fully engaged in the lock position.
Figure 26B:
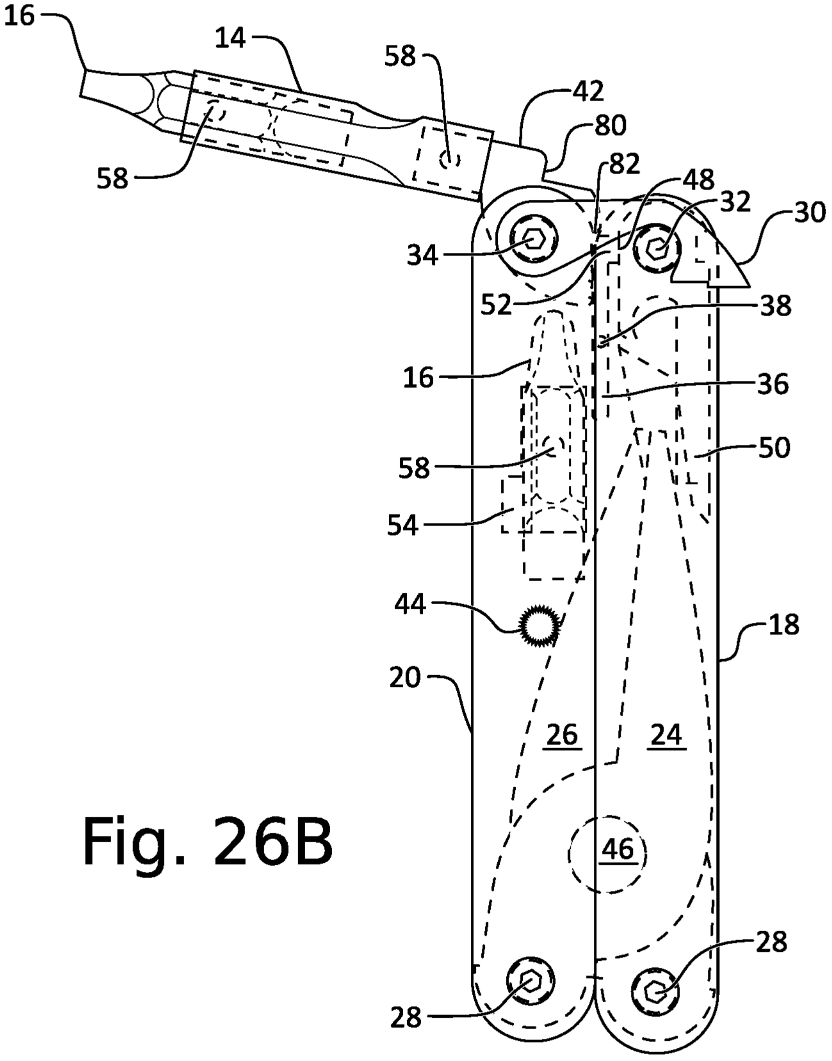
Figure 27A:
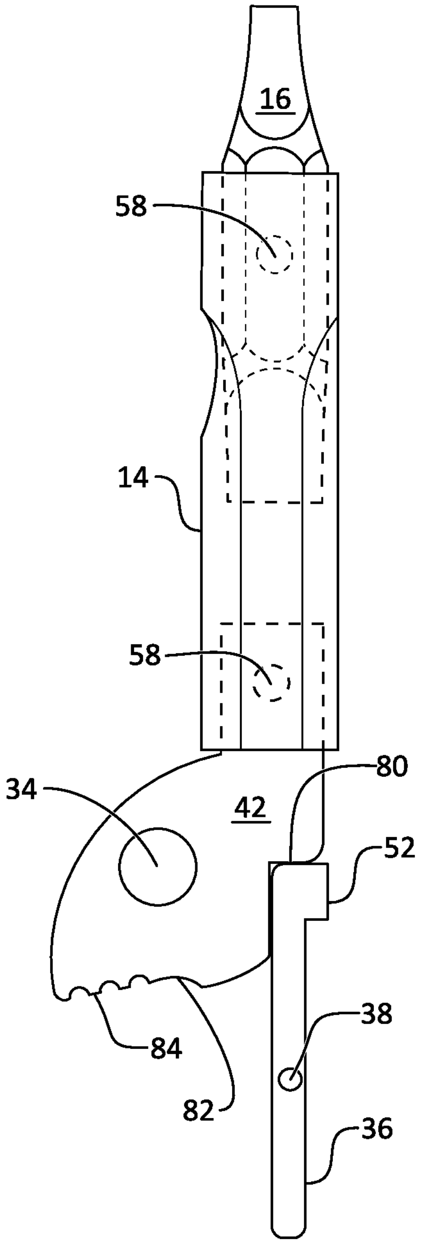
FIGS. 27A and 27B show the alternative configuration of FIGS. 26A and 26B in which the tool shaft 14 is depicted in the fully extended position.
Figure 27B:
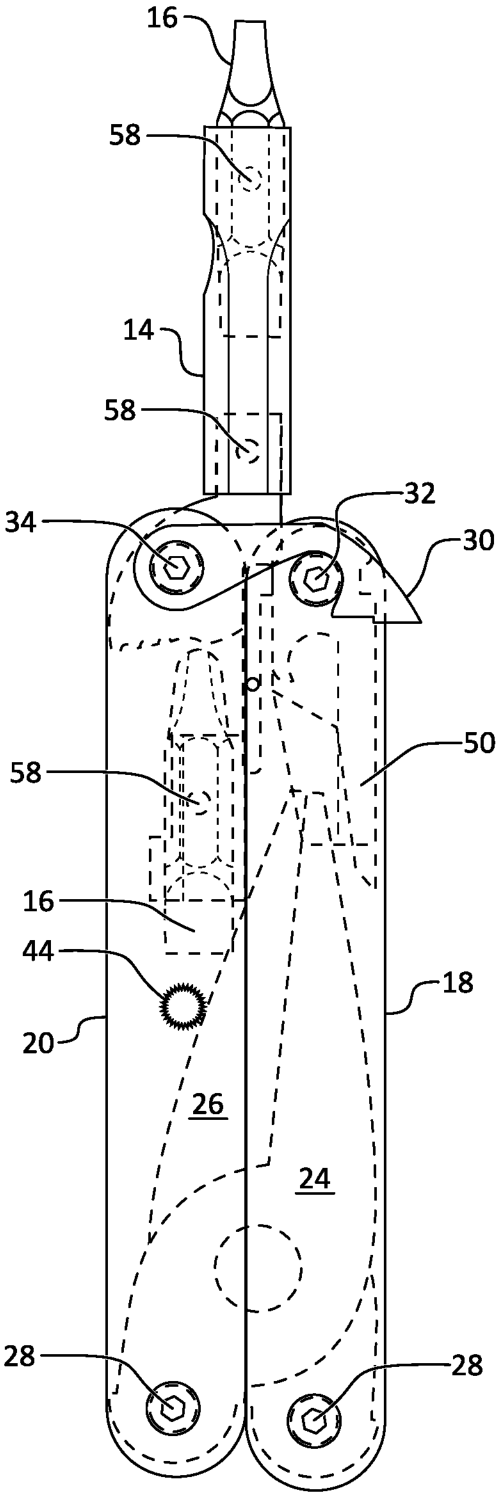
Figure 28:
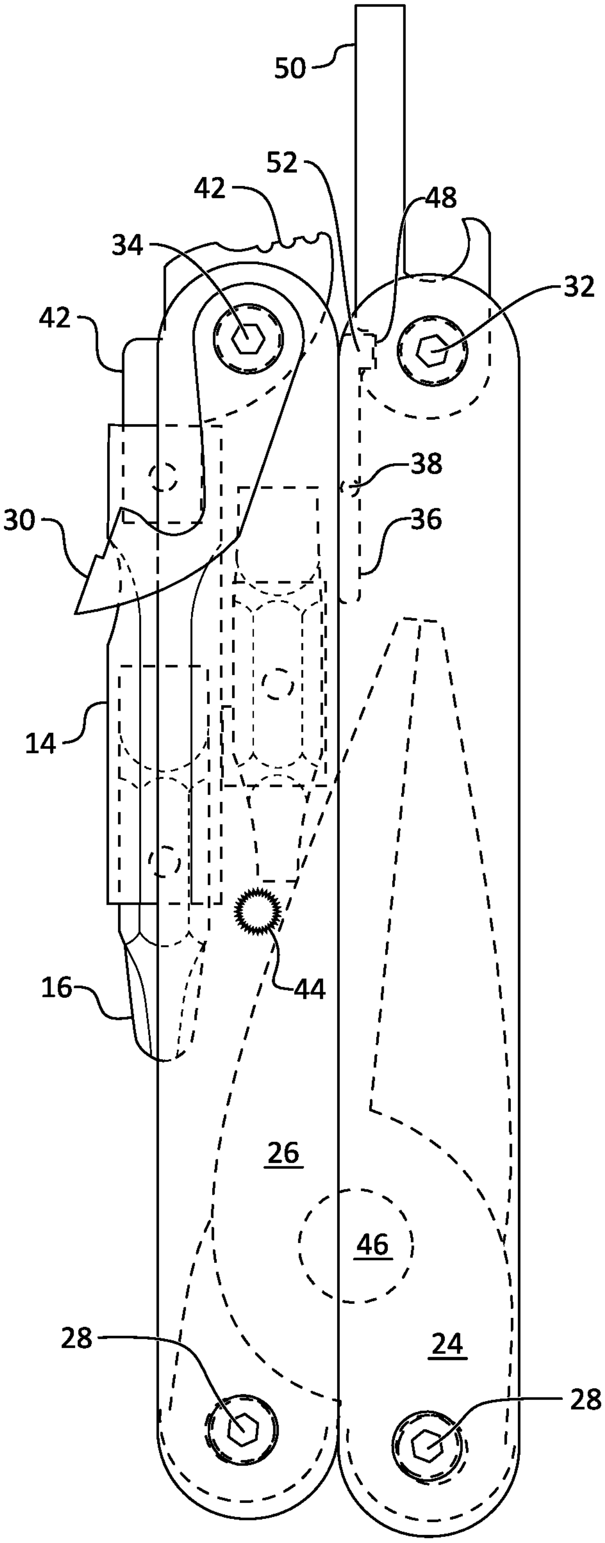
FIG. 28 shows an embodiment of the multitool 12 with a tool accessory lock 36 on the inside of the handle 18 and the alternative design of the tool accessory 50 complimentary mating profile 48 with the tool accessory 50 fully deployed with the handles 18 and 20 in a closed position.
Figure 29A:
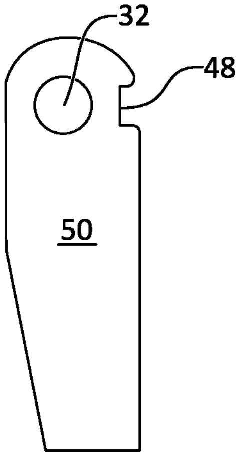
FIGS. 29A and 29B show alternative tool accessories 50 that have the complimentary mating profile 48 for the embodiment of the multitool 12 in which the tool accessory lever lock 36 is on the inside of the handle 18.
Figure 29B:
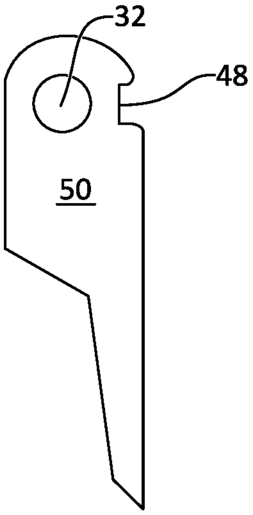
Figure 30A:
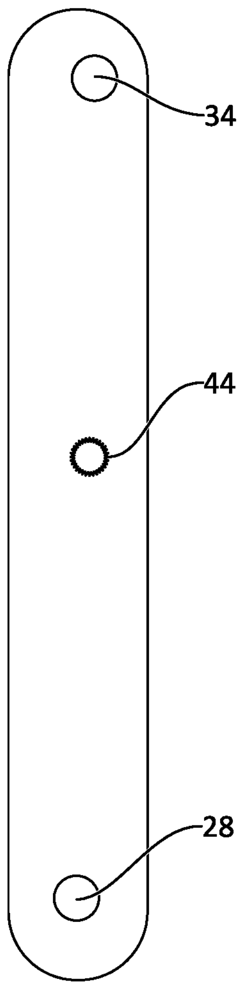
FIGS. 30A-30C shows the handles 18 and 20 of the multitool 12 according to the alternative embodiments depicted in FIGS. 25-29B.
Figure 30B:
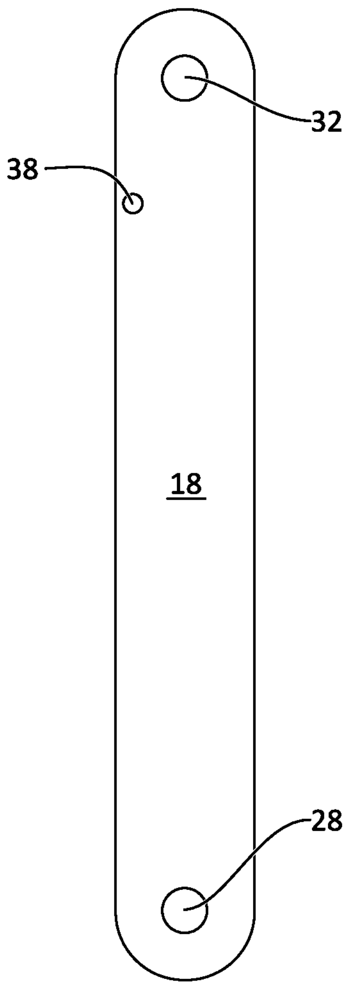
Figure 30C:
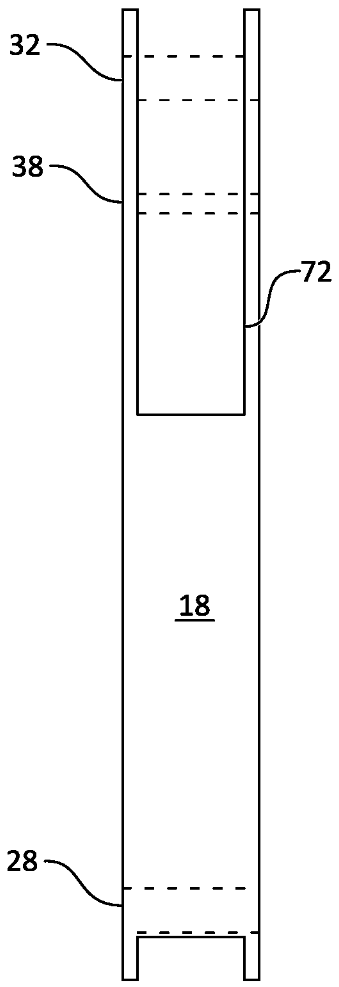
Figure 31:
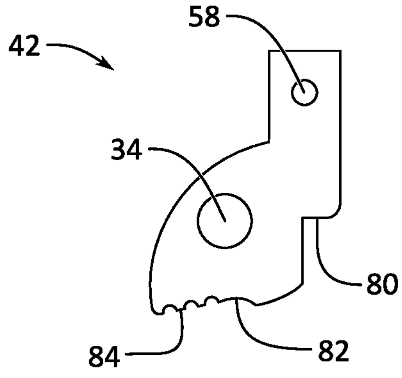
FIG. 31 shows an alternative of the tool shaft 12 base 42 which has two positions for mating profile at 80 and 82, and also shows the thumb ridges 84 which facilitate easy opening of the tools, and the ball detent 58 to facilitate mating with a shaft tool 14 that has a ball.

FIG. 25 shows another embodiment of the present design with the tool accessory locking mechanism 36 being disposed on the inside of the handle 18 in which the back profile of the bar 52 mates with the tool shaft 14 base 42. FIGS. 26A and 26B show an alternative configuration of the tool shaft base 42 and angle deployment mating profile 82 which permits the use of the drive shaft 12 fixed at an angle to the handles 18 and 20 and the handle locking mechanism 30 fully engaged in the lock position. FIGS. 27A and 27B show the alternative configuration of FIGS. 26A and 26B in which the tool shaft 14 is depicted in the fully extended position. FIG. 28 shows an embodiment of the multitool 12 with a tool accessory lock 36 on the inside of the handle 18 and the alternative design of the tool accessory 50 complimentary mating profile 48 with the tool accessory 50 fully deployed with the handles 18 and 20 in a closed position. FIGS. 29A and 29B show alternative tool accessories 50 that have the complimentary mating profile 48 for the embodiment of the multitool 12 in which the tool accessory lever lock 36 is on the inside of the handle 18. FIGS. 30A-30C shows the handles 18 and 20 of the multitool 12 according to the alternative embodiments depicted in FIGS. 25-29B. FIG. 31 shows an alternative of the tool shaft 12 base 42 which has two positions for mating profile at 80 and 82, and also shows the thumb ridges 84 which facilitate easy opening of the tools, and the detent 58 to facilitate mating with a shaft tool 14 that has a ball.

Figure 32:
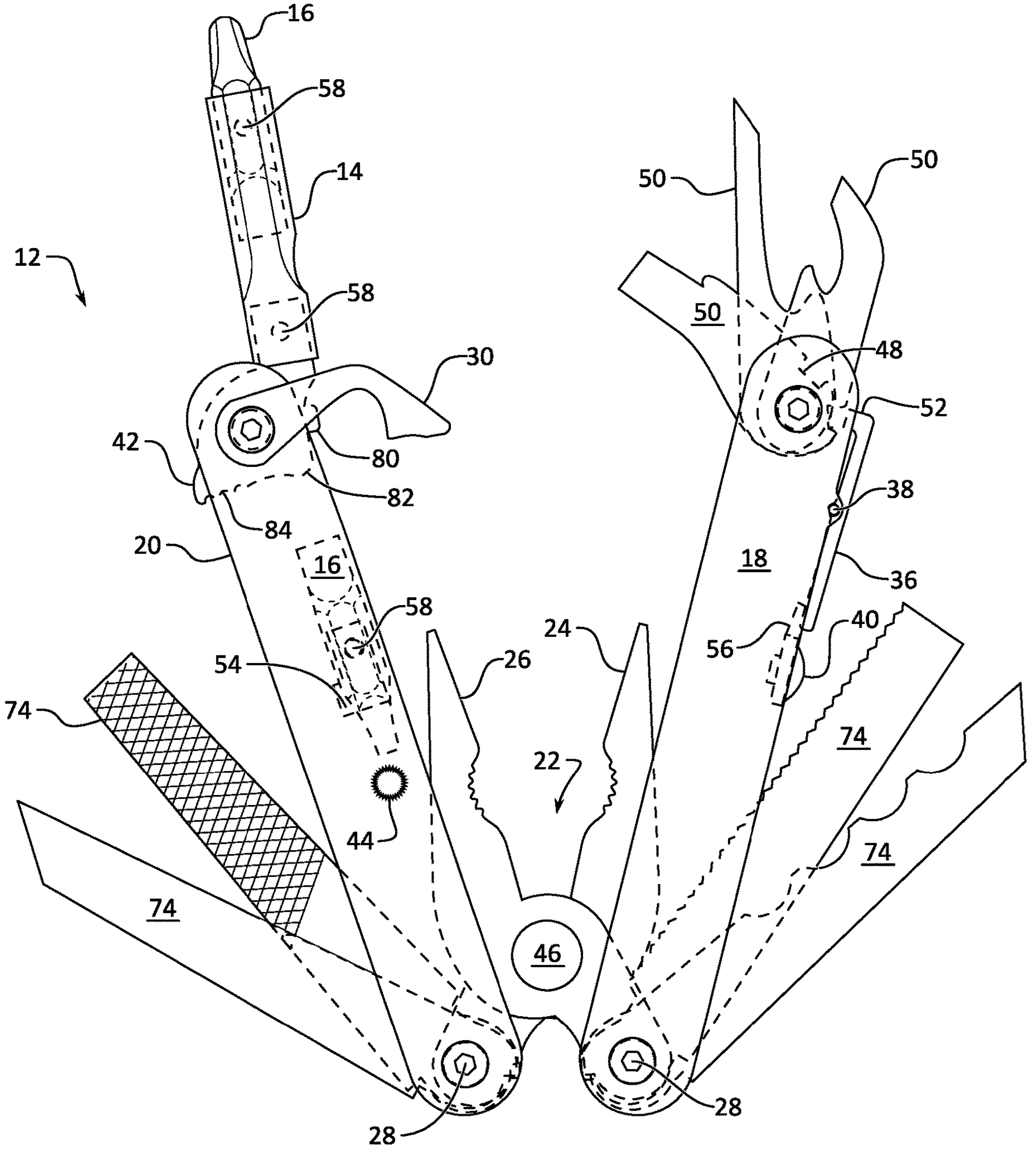
FIG. 32 shows an alternative embodiment of the present invention of a multitool 12 which has additional tools 74 disposed adjacent the plier head 22 at pivots 28.
Figure 33A:
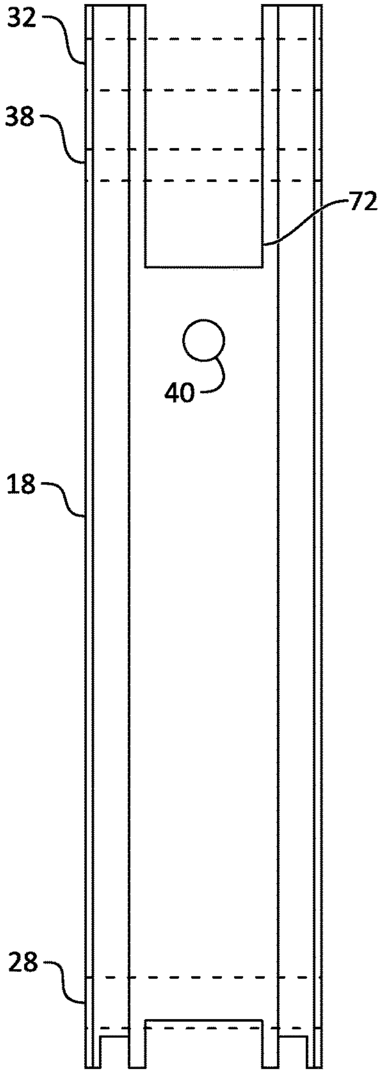
FIGS. 33A-33D show an alternative configuration of the handles 18 and 20 according to the embodiment of the multitool 12 depicted in FIG. 32 showing where the extra tools 74 are disposed.
Figure 33B:
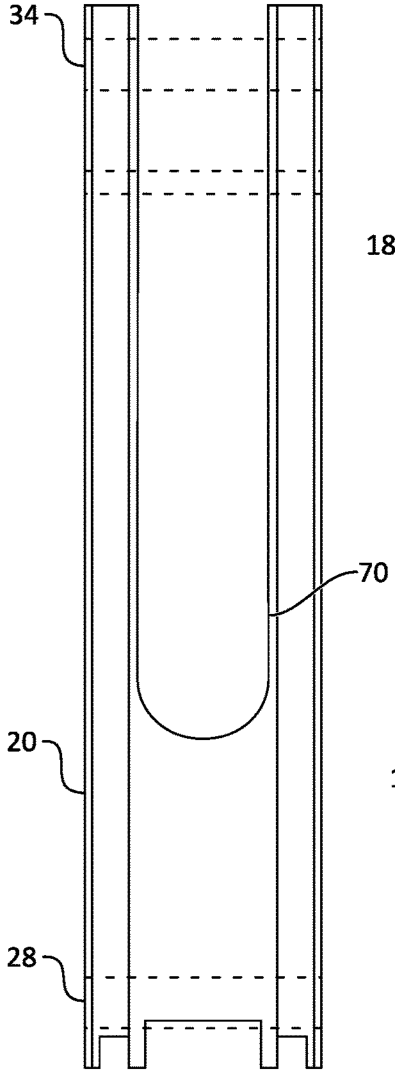
Figure 33C:
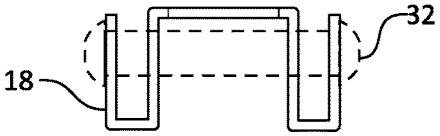
Figure 33D:
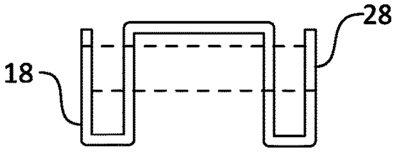
Figure 34A:
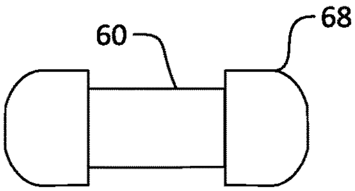
FIGS. 34A-34C show alternative threaded pins 62, pin shafts 60, and heads 68.
Figure 34B:
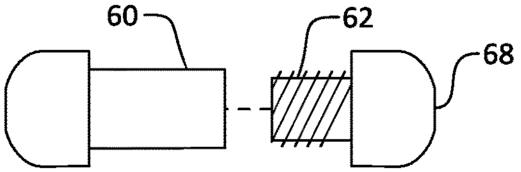
Figure 34C:
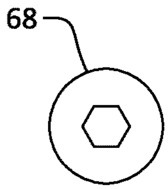

FIG. 32 shows an alternative embodiment of the present invention of a multitool 12 which has additional tools 74 disposed adjacent the plier head 22 at pivots 28. FIGS. 33A-33D show an alternative configuration of the handles 18 and 20 according to the embodiment of the multitool 12 depicted in FIG. 32 showing where the extra tools 74 are disposed. FIGS. 34A-34C show alternative threaded pins 62, pin shafts 60, and heads 68.

Figure 35A:
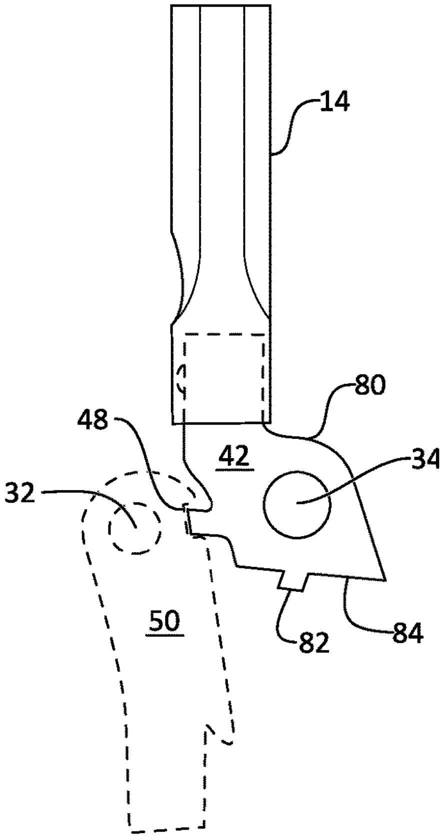
FIGS. 35A and 35B show alternative mating profiles 80, 82 and complimentary mating profiles 48 that provide for an angled position and an extended position accordingly.
Figure 35B:
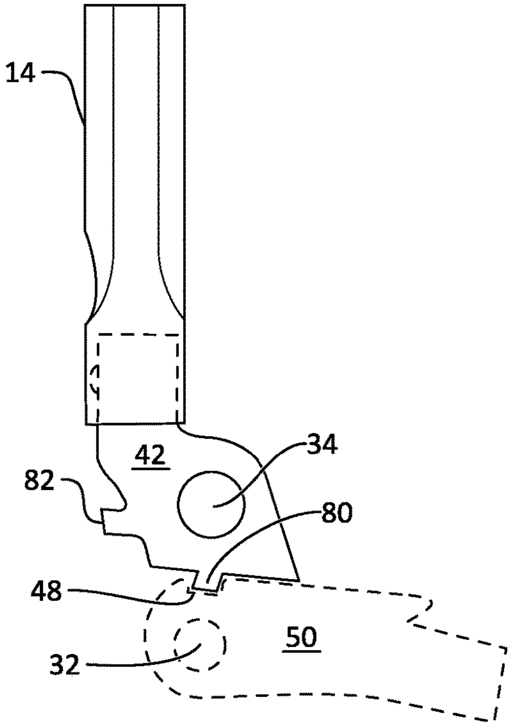
Figure 36A:
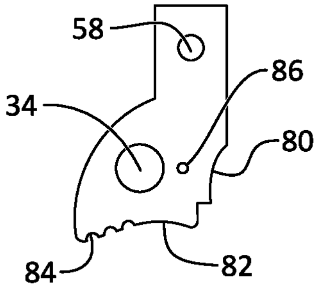
FIGS. 36A-36C show another alternative for the base 42 having a pin 86 and groove 88 configuration which restricts the movement of the tool shaft 14 relative to the handle 20.
Figure 36B:
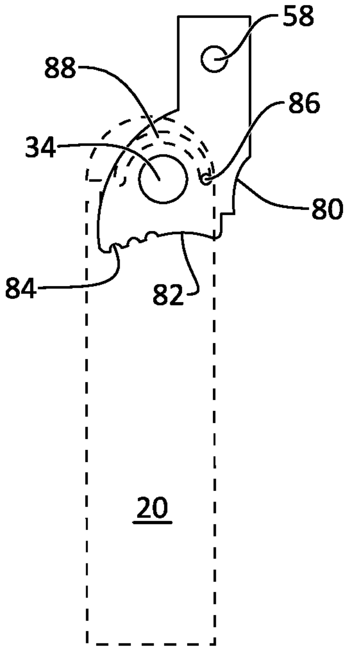
Figure 36C:
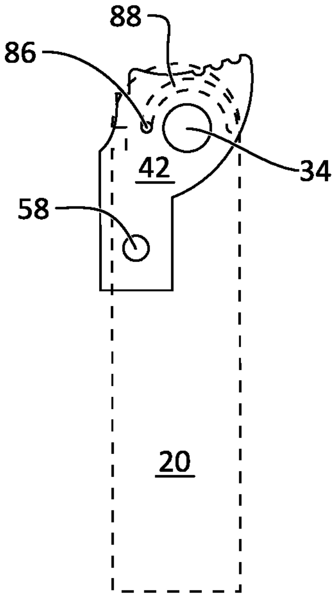
Figure 37A:
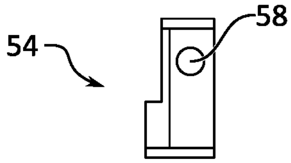
FIGS. 37A-37C show an alternative bit holder 54 and detent 58 to receive a bit 16.
Figure 37B:
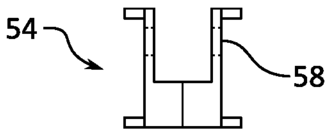
Figure 37C:
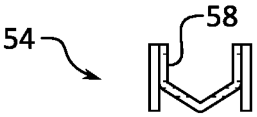

Additional alternatives are available. FIGS. 35A and 35B show alternative mating profiles 80, 82 and complimentary mating profiles 48 that provide for an angled position and an extended position accordingly. FIGS. 36A-36C show another alternative for the base 42 having a pin 86 and groove 88 configuration which restricts the movement of the tool shaft 14 relative to the handle 20. FIGS. 37A-37C show an alternative bit holder 54 and detent 58 to receive a bit 16.

It is to be understood that the present invention is not limited to the embodiments described above, but encompasses any and all embodiments within the scope of the following claims.

The invention claimed is:

1. A multitool (12) with locking multipurpose driver, the multitool (12) comprising:

a plier head (22) and first and second handles (18 and 20);

the plier head (22) having opposing first and second plier halves (24 and 26) which pivot at a central pivot (46) to open and close when the multitool (12) is in an open position;

each of the first and second handles (18 and 20) extend from the first and second plier halves (24 and 26) at plier-to-handle pivots (28);

a tool shaft (14) is disposed on the second handle (20) at a handle-to-tool shaft pivot (34) disposed on the second handle (20) opposite the plier head (22), wherein the tool shaft (14) extends outward of the handle-to-tool shaft pivot (34), and stows into the outer side of the second handle (20);

wherein the tool shaft (14) has a mating profile (80) which engages a complimentary mating profile (48) formed at an opposing pivot (32) on the first handle (18) opposite the plier head (22) and locks the tool shaft (14) by closing the first and second handles (18 and 20) with the tool shaft (14); and the tool shaft (14) is positioned and extends from a center of the first and second handles (18 and 20) when closed.

2. The multitool of claim 1, wherein:

a mechanism for locking accessories in place operated by closing the first and second handles comprises a first indenture or tab at the base of the accessory which mates with a corresponding feature in the opposing first or second handle or on an accessory disposed in the opposing first or second handle with the tool shaft (14) disposed and extending from the center of the first and second handles (18 and 20).

3. The multitool of claim 2, further comprising:

the mechanism for locking accessories in place operated by closing the first and second handles further comprises a second indenture or tab at an angle to the first indenture or tab which mates with a corresponding feature in the opposing first or second handle or on an accessory disposed in the opposing first or second handle to hold the tool shaft (14) at a different angle to the first and second handles (18 and 20) in order to apply more torque on the tool shaft (14).

4. The multitool of claim 3, wherein:

the safety handle locking mechanism (30) is partially/initially deployed by moving the tool shaft (14) into an open fully extended position.

5. The multitool with locking multipurpose driver of claim 1, further comprising:

a safety handle locking mechanism (30) that fits over both first and second handles (18 and 20) when closed.

6. The multitool of claim 5, further comprising a tool bit holder (54).

7. The multitool of claim 1, wherein the centrally disposed tool is a driver, and a tool shaft.

8. The multitool of claim 1, wherein the tool may be disposed in one of two open positions fully opened, and halfway opened.

9. The multitool 12 of claim 1, further comprising a thumb actuated safety lock (30).

10. The multitool 12 of claim 1, further comprising:

a plier stop (44) disposed in the second handle (20) to position the plier head (22) off-center in the first handle (18).

11. A multitool 12 with locking multipurpose driver, the multitool (12) comprising:

a plier head (22) and first and second handles (18 and 20);

the plier head (22) having opposing first and second plier halves (24 and 26) which pivot at a central pivot (46) to open and close when the multitool (12) is in an open position;

each of the first and second handles (18 and 20) extend from the first and second plier halves (24 and 26) at plier-to-handle pivots (28);

a tool shaft (14) is disposed on the second handle (20) at a handle-to-tool shaft pivot (34) disposed on the second handle (20) opposite the plier head (22), wherein the tool shaft (14) extends outward of the handle-to-tool shaft pivot (34), and stows into the outer side of the handle (20);

wherein the tool shaft (14) has a mating profile (80) which engages a complimentary mating profile (48) formed at an opposing pivot (32) on the first handle (10) opposite the plier head (22) and locks the tool shaft (14) by closing the first and second handles (18 and 20) with the tool shaft (14); and the tool shaft (14) is positioned and extends from a center of the first and second handles (18 and 20) when closed;

wherein the centrally disposed tool is a driver having a tool shaft.

12. The multitool of claim 11, wherein:

a mechanism for locking accessories in place operated by closing the first and second handles comprises a first indenture or tab at the base of the accessory which mates with a corresponding feature in the opposing first or second handle or on an accessory disposed in the opposing first or second handle with the tool shaft (14) disposed and extending from the center of the first and second handles (18 and 20).

13. The multitool of claim 11, further comprising:

a mechanism for locking accessories in place operated by closing the first and second handles further comprises a second indenture or tab at an angle to the first indenture or tab which mates with a corresponding feature in the opposing first or second handle or on an accessory disposed in the opposing first or second handle to hold the tool shaft (14) at a different angle to the first and second handles (18 and 20) in order to apply more torque on the tool shaft (14).

14. The multitool with locking multipurpose driver of claim 11, further comprising:

a safety handle locking mechanism (30) that fits over both first and second handles (18 and 20) when closed.

15. The multitool 12 of claim 14, wherein:

the safety handle locking mechanism (30) is partially/initially deployed by moving the tool shaft (14) into an open fully extended position.

16. The multitool of claim 14, further comprising a tool bit holder (54).

17. The multitool of claim 11, wherein the tool may be disposed in one of two open positions fully opened and halfway opened.

18. The multitool 12 of claim 11, further comprising a thumb actuated safety lock (30).

19. The multitool 12 of claim 11, further comprising: a plier stop (44) disposed in the second handle (20) to position the plier head (22) off-center in the first handle (18).

* * * * *